United States Patent [19]

Archie et al.

[11] Patent Number: 5,021,997

[45] Date of Patent: Jun. 4, 1991

[54] TEST AUTOMATION SYSTEM

[75] Inventors: Kent C. Archie, Warrenville; Owen R. Fonorow, Plainfield; Mary C. McGould, Wheaton; Robert E. McLear, III, Warrenville; Edward C. Read, Bolingbrook; Edwin M. Schaefer, III, North Aurora; Suzanne E. Schwab, Chicago; Dennis Wodarz, Naperville, all of Ill.

[73] Assignee: AT&T Bell Laboratories, Murray Hill, N.J.

[21] Appl. No.: 912,799

[22] Filed: Sep. 29, 1986

[51] Int. Cl.⁵ .............................................. G06F 11/34
[52] U.S. Cl. .................................. 364/900; 364/921.8; 364/931.44; 364/964.1; 371/16.1
[58] Field of Search ............ 371/19, 17, 16.1, 18; 364/200 MS File, 579, 580, 900 MS File

[56] References Cited

U.S. PATENT DOCUMENTS

| | | | |
|---|---|---|---|
| 3,733,587 | 5/1973 | Lloyd et al. | 364/900 |
| 4,296,409 | 10/1981 | Whitaker et al. | 364/580 |
| 4,358,824 | 11/1982 | Glickman et al. | 364/200 |
| 4,383,298 | 5/1983 | Huff et al. | 364/200 |
| 4,384,325 | 5/1983 | Slechta et al. | 364/200 |
| 4,399,502 | 8/1983 | MacDonald et al. | 364/579 |
| 4,402,055 | 8/1983 | Lloyd et al. | 371/15.1 |
| 4,404,639 | 9/1983 | McGuire et al. | 364/551 |
| 4,424,576 | 1/1984 | Lange et al. | 371/18 |
| 4,437,184 | 3/1984 | Cork et al. | 371/19 |
| 4,453,217 | 6/1984 | Boivie | 364/200 |
| 4,468,732 | 8/1984 | Raver | 364/200 |
| 4,495,566 | 1/1985 | Dickinson et al. | 364/200 |
| 4,545,011 | 10/1985 | Lyon et al. | 364/200 |
| 4,589,068 | 5/1986 | Heinen, Jr. | 364/300 |
| 4,595,981 | 6/1986 | Leung | 364/300 |
| 4,606,025 | 8/1986 | Peters et al. | 371/20 |
| 4,611,320 | 9/1986 | Southard | 370/15 |
| 4,617,663 | 10/1986 | Lake et al. | 371/19 |
| 4,639,916 | 1/1987 | Boutterin et al | 371/16.1 |
| 4,648,044 | 3/1987 | Hardy et al. | 364/900 |
| 4,649,515 | 3/1987 | Thompson et al. | 371/15.1 |
| 4,654,852 | 3/1987 | Bentley et al. | 364/900 |
| 4,658,370 | 4/1987 | Erman et al. | 364/900 |
| 4,670,834 | 6/1987 | Byal et al. | 371/16.1 |
| 4,730,315 | 3/1988 | Saito et al. | 364/200 |
| 4,736,374 | 4/1988 | Kump et al. | 371/15.1 |
| 4,742,467 | 5/1988 | Messerich et al. | 364/200 |
| 4,841,456 | 6/1989 | Hogan, Jr. et al. | 371/15.1 |
| 4,899,306 | 2/1990 | Greer | 371/16.1 |

OTHER PUBLICATIONS

C. A. Heuermann et al., "Automated Test and Verification," IBM Technical Disclosure Bulletin, vol. 17, No. 7, Dec. 74.

(List continued on next page.)

Primary Examiner—Michael R. Fleming
Assistant Examiner—Debra A. Chum
Attorney, Agent, or Firm—David Volejnicek

[57] ABSTRACT

A test automation system (FIG. 1) comprises storage and process components connected by file interfaces. BPLAN (103) creates and stores test descriptions in test information database (102). Tests are stored in test storage hierarchy (100). BSYNC (104) completes test descriptions in database (102) from contents of hierarchy (100). BQUERY (105) examines descriptions and selects tests for execution. TESTLOCS file (106) identifies selected tests. BQUERY (105) uses BBC (118) to communicate requests for tests and test descriptions to other systems. BBCMON (120) causes BQUERY (105) to satisfy requests and uses BBC (118) to communicate responses to requesting systems. BDLOAD (107) gathers tests identified by file (106) from hierarchy (100) into file (117) for downloading from host (10) to target (11) processor. BRUN (109) executes download tests, collects test results in files (110-112), and reports result summaries. BULOAD (113) assembles files (110-112) into file (114) for uploading to processor (10). BSTORE (115) stores uploaded results in results database (116). BQUERY (105) examines test results collected in database (116).

21 Claims, 14 Drawing Sheets

OTHER PUBLICATIONS

C. D. Fuget et al., "Tools for Automating Software Test Package Execution", *Hewlett-Packard Journal*, Mar. 1986, pp. 24-28.

Xpediter Brochure, Application Development Systems, Inc. Minneapolis, MN.

IEEE Standard for Software Test Documentation, ANSI/IEEE Std 829-1983, Feb. 18, 1983, pp. 9-48.

H. M. Sneed et al., "Automated Software Quality Assurance", *IEEE Transactions on Software Engineering*, vol. SE-11, No. 9, Sep. 1985, pp. 909-906.

P. Joslin, "Tools for Reliability Testing Automation", IEEE Pub. CH2154-3/85/0000/0454, 1985, pp. 454-458.

E. J. Chauza, "Experiences of Developing and Implementing a Configuration Management System for a Large Development Switching System", IEEE Pub., CH2154-3/85/0000/0092, 1985, pp. 92-96.

J. R. Bugarin, "Triggers: A Software Testing Tool", *Hewlett-Packard Journal*, Mar. 1986, pp. 35-36.

R. N. Sum, Jr., "An Approach to Operating System Testing with Application to the IBM System 9000", Univ. of Ill. at Urbana-Champaign, Thesis, Jul. 1985.

G. J. Myers, *The Art of Software Testing*, J. Wilsey & Sons, 1979, pp. 147-174.

W. Hetzel, *The Complete Guide to Software Testing*, QED Information Sciences, Inc., 1984, pp. 87-128.

*Product Summary*, Software Research Associates.

J. G. Wilber, "Enhancing Device Test Programming Productivity: The Catalyst Automated Test Program Generator", *Proceedings of the 1985 IEEE Int'l Test Conf.* (Nov. 19-21, 1985), paper 8.1, pp. 252-262.

M. Klinger et al., "A Knowledge Based System for Automatic Testing of Electronic Equipment", *Proceedings of the IEEE 14th Convention of Electrical & Electronics Engineers in Israel* (Tel Aviv, Mar. 26-28, 1985) paper 4.4.3, pp. 1-6.

J. Lyman, "Expert Systems Tackle VLSI Testing", *Electronics*, Nov. 25, 1985, pp. 56-57.

J. T. Healy, "An Information Processing Software System for ATE", *Proceedings of the 1984 IEEE Int'l. Test Conf.*, (Oct. 16-18, 1984), paper 15.4, pp. 497-505.

O. Grillmeyer et al., "The Design and Construction of a Rule Base and an Inference Engine for Test System Diagnosis", *Proceedings of the 1985 IEEE Int'l. Test Conf.*, (Nov. 19-21, 1985), paper 23.2, pp. 857-867.

H. J. Warren et al., "AUTOSIM: An Automatic Simulation Program Generator", *Mathematics and Computers in Simulation*, vol. 27, No. 2-3, Apr. 1985, pp. 107-114.

```
300                           400
┌─────────────┐              ┌─────────────┐
│ ID      301 │              │ ID      401 │
├─────────────┤              ├─────────────┤
│ ORIGIN  302 │              │ ORIGIN  402 │
├─────────────┤              ├─────────────┤
│ CONTACT 303 │              │ CONTACT 403 │
├─────────────┤              ├─────────────┤
│ REQT    304 │              │ REQT    404 │
├─────────────┤              ├─────────────┤
│ TYPE    305 │              │ TYPE    405 │
├─────────────┤              ├─────────────┤
│ OBJECT  306 │              │ OBJECT  406 │
├─────────────┤              ├─────────────┤
│ PURPOSE 307 │              │ PURPOSE 407 │
├─────────────┤              ├─────────────┤
│ METHOD  308 │              │ METHOD  408 │
├─────────────┤              ├─────────────┤
│ KEYWORDS 309│              │ KEYWORDS 409│
├─────────────┤              ├─────────────┤
│ HCONFIG 310 │              │ HCONFIG 410 │
├─────────────┤              ├─────────────┤
│ SCONFIG 311 │              │ SCONFIG 411 │
├─────────────┤              ├─────────────┤
│ PTIME   312 │              │ RUNTIME 412 │
├─────────────┤              ├─────────────┤
│ STIME   313 │              │ LOCATION 413│
├─────────────┤              ├─────────────┤
│ SETUP   314 │              │ FORMAT  414 │
├─────────────┤              ├─────────────┤
│ PROCEDURE 315│             │ PENDMRS 415 │
├─────────────┤              ├─────────────┤
│ CLEANUP 316 │              │ DESIGN DOC 416│
├─────────────┤              ├─────────────┤
│ DEPEND  317 │              │ PROC DOC 417│
├─────────────┤              ├─────────────┤
│ COMMENT 318 │              │ SUPCLS  418 │
├─────────────┤              ├─────────────┤
│ COUNT   319 │              │ LMODBY  419 │
└─────────────┘              ├─────────────┤
                             │ LMODATE 420 │
  TESTCASE FORMAT            ├─────────────┤
                             │ SIZE    421 │
     *FIG. 3*                ├─────────────┤
                             │ COUNT   422 │
                             └─────────────┘

TESTINFO RECORD

*FIG. 4*
```

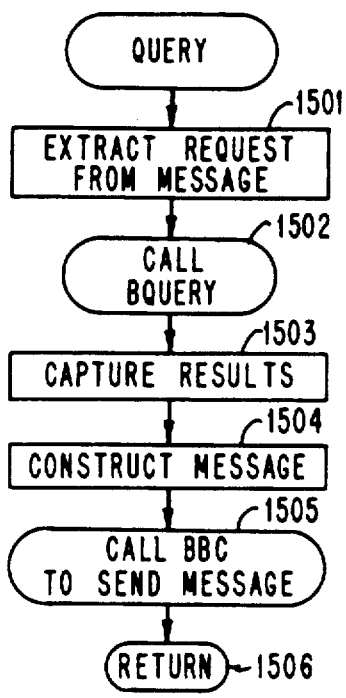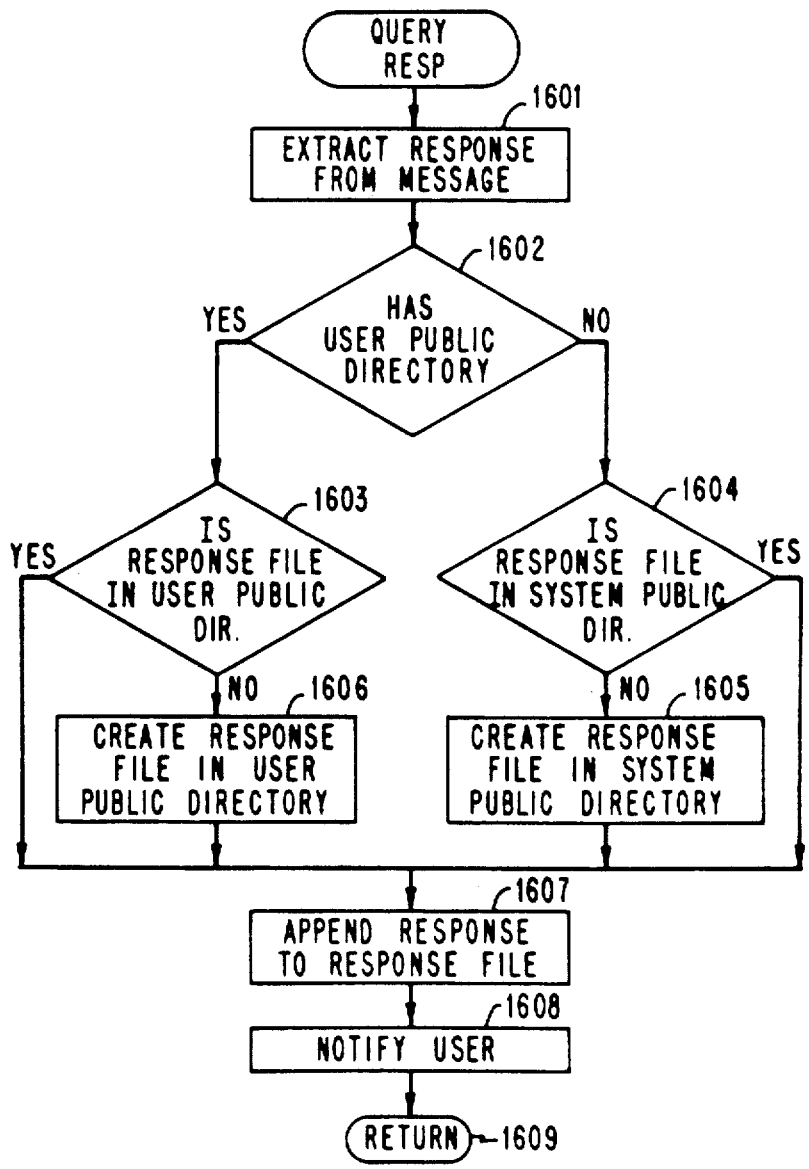

TEST AUTOMATION SYSTEM

TECHNICAL FIELD

This invention generally relates to test tools, and particularly relates to tools for automating of testing procedures and test management of projects such as software or computer development projects.

BACKGROUND OF THE INVENTION

Computer hardware, firmware, and software are becoming ever-increasingly complex. As a consequence, so are the procedures, systems, and tests for testing them.

Commonly, testing organizations for various projects, even within the same company, work independently to develop and implement their own, different, testing methodologies and testing tools. Consequently, a variety of tools and test packages exist which meet specific testing needs but do not provide a general-purpose testing environment. This inhibits the sharing of tests among testing organizations. It also leads to much duplication of test development and test management work that has already been done by other organizations, because the prior work is typically embodied in a form incompatible with, and hence not useful to, other testing organizations.

Because other organizations are typically not easily able to build upon the work of others but rather start anew, existing testing methodologies generally lack the level of sophistication and refinement that would be expected of long-term on-going developments. For example, tests are typically not developed, executed, or maintained in a consistent manner. Managing and planning of the overall testing effort is difficult. Test development, execution, and validation is labor-intensive. Requirements and documentation are incomplete and do not conform to rigid standards. Information about tests must be obtained from the tests themselves, is inconsistent in type from project to project, and is difficult to extract. Test results are difficult to understand, and therefore to report. Attempts at test automation are rudimentary, and lack modularity and versatile interfaces such as would facilitate change and growth. And different projects use different—often vague to outsiders—non-standard testing terminology. Because inter-project test and test tool compatibility is so rare, test-sharing capability is typically not provided even among systems that may be compatible.

Hence, a problem in the art is lack of an arrangement that supports automation of the testing and test management processes and that enforces standardization of those processes, yet does so in a manner versatile enough to avoid imposing undesirable constraints on test archives of disparate testing organizations, that facilitates tool evolution and change, that provides users with information about tests and test results readily, easily, and in a consistent manner, that aids users in selecting and obtaining tests for execution, and that permits tests to be easily shared among a plurality of testing organizations.

SUMMARY OF THE INVENTION

This invention is directed to solving these and other problems of the prior art. The invention is a test automation system. According to the invention, the test automation system is made up of a plurality of cooperating storage arrangements and functional tools. At its most basic, the system is structured as follows. A first storage arrangement—illustratively a hierarchial file storage—stores tests. A second storage arrangement—illustratively a first database—stores descriptions of the tests. The descriptions are separate from the tests themselves. The storage arrangements need be only logically separate to achieve this; they need not be physically separate, though typically they are physically separate as well, due to the differences in form and desired means of access of their contents. A first tool, called BQUERY in the illustrative embodiment, identifies, from descriptions stored in the second storage arrangement, tests having selected characteristics—for example, characteristics that were requested by a user. And a second tool, called BDLOAD in the illustrative embodiment, extracts from the first storage arrangement the tests that were identified by the first tool. Preferably, a third tool, called BRUN in the illustrative embodiment, executes the tests that were extracted by the second tool.

Expanded further, the system additionally includes a third storage arrangement —also a database—that stores test results. The third tool executes the tests and collects the results of test execution, and a fourth tool, called BSTORE in the illustrative embodiment, stores the collected results in the third storage arrangement.

The system provides test storage, test characterization, and test selection, and preferably also test execution, results collection, and results storage. Since it is the system and not the individual user that provides these functions, they are provided in a standardized, consistent manner; hence, the testing and test management processes are standardized both within a testing organization and among different testing organizations. The internal consistency simplifies the managing and planning of the overall testing effort, while the external consistency promotes sharing and adoption, as opposed to duplication, of existing tests and testing methodologies. Since the tools, in conjunction with the databases and the file storage, provide the various functions automatically in response to user calls therefor, much of the testing effort is automated and the user is relieved of much labor and complexity of action that has traditionally been a part of the testing effort. Because the testing process is so simplified, even a relatively unsophisticated user who has limited experience with testing and little or no understanding of the detailed procedures involved in the testing effort is able to make effective use of the test automation system. Test-related storage and functionality are modularized into the separate databases, file storage, and tools, thereby facilitating change of these components independently of each other. System change, evolution, and growth are thereby simplified and therefore encouraged. Because the test storage arrangement and test description database are separate, the test storage arrangement's structures are not imposed on the test description database, and preferably, no constraints are imposed by the system on the test storage arrangement. Hence, the system is independent of the storage configurations selected by various testing organizations for their tests, and vice versa. Furthermore, the test description database provides advantages with respect to the test storage arrangements akin to those provided by a library card catalog with respect to the library's stacks.

To enable a system user to examine descriptions of tests, in response to a user request the first tool searches through the second storage arrangement to identify test descriptions having selected characteristics—those specified by the user. The first tool then extracts the identified test descriptions from the second storage arrangement, and provides them to the user. For example, the first tool displays the test descriptions on a terminal screen.

To facilitate use of the test automation system in an arrangement wherein the databases and file storage are located on one (host) processor but test execution occurs on another (target) processor, preferably the second tool includes a component that gathers the extracted tests into an output file for transfer from the host to the target processor, and the system further includes a fifth tool, called BULOAD in the illustrative embodiment, that gathers test results collected by the third tool into an output file for transfer from the target to the host processor.

To facilitate creation of test descriptions and to ensure consistency thereof, in form and content type with each other and in content with the tests themselves, the system preferably includes two additional tools. A sixth tool, called BPLAN in the illustrative embodiment, prompts a user for test description information and stores the information received in response to the prompts in the first database. And a seventh tool, called BSYNC in the illustrative embodiment, supplements in the first database the test description information that was stored therein by the sixth tool with information that it extracts from the stored tests themselves.

To facilitate a user's perusal of test results, the first tool of the system (BQUERY) further extracts from the second database test results that have selected characteristics—again, for example, characteristics requested by a user.

Significantly, to facilitate the sharing of tests among a plurality of test automation systems that are coupled together by a communication arrangement, the system includes an eighth tool, called BBC in the illustrative embodiment, that communicates with the other test automation systems. For example, the eighth tool communicates to another system a request for tests having selected characteristics. Such a request may be generated, for example, by the first tool in response to a user request. At the other system, a ninth tool, called BBCMON in the illustrative embodiment, performs the communicated request. Illustratively, the ninth tool responds to receipt of the request and causes the first tool to search the test description in the second storage arrangement to identify tests having the characteristics specified by the received request, then causes the second tool to extract from the first storage arrangement the tests identified by the first tool, and finally causes the eighth tool to communicate the extracted tests to the system that requested them.

The just-described configuration of the test automation system also enables users at one system to peruse test descriptions of tests of another system. The eighth tool communicates to another system a request —illustratively likewise generated by the first tool—for test descriptions having selected characteristics. At the other system, the ninth tool responds to receipt of the request and causes the first tool to identify in the second storage arrangement test descriptions having the characteristics specified by the received request, and then causes the eighth tool to communicate the extracted test descriptions to the system that requested them.

These and other advantages and features of the present invention will become apparent from the following description of an illustrative embodiment of the invention taken together with the drawing.

BRIEF DESCRIPTION OF THE DRAWING

FIG. 3 is a block diagram of a test case file of FIG. 1 illustrating the test case format;

FIG. 4 is a block diagram of a record of test database of FIG. 1;

FIG. 16 is a flow diagram of QUERY routine of FIG. 15;

FIG. 17 is a flow diagram of QUERY RESP routine of FIG. 15;

DETAILED DESCRIPTION

Figure 1:
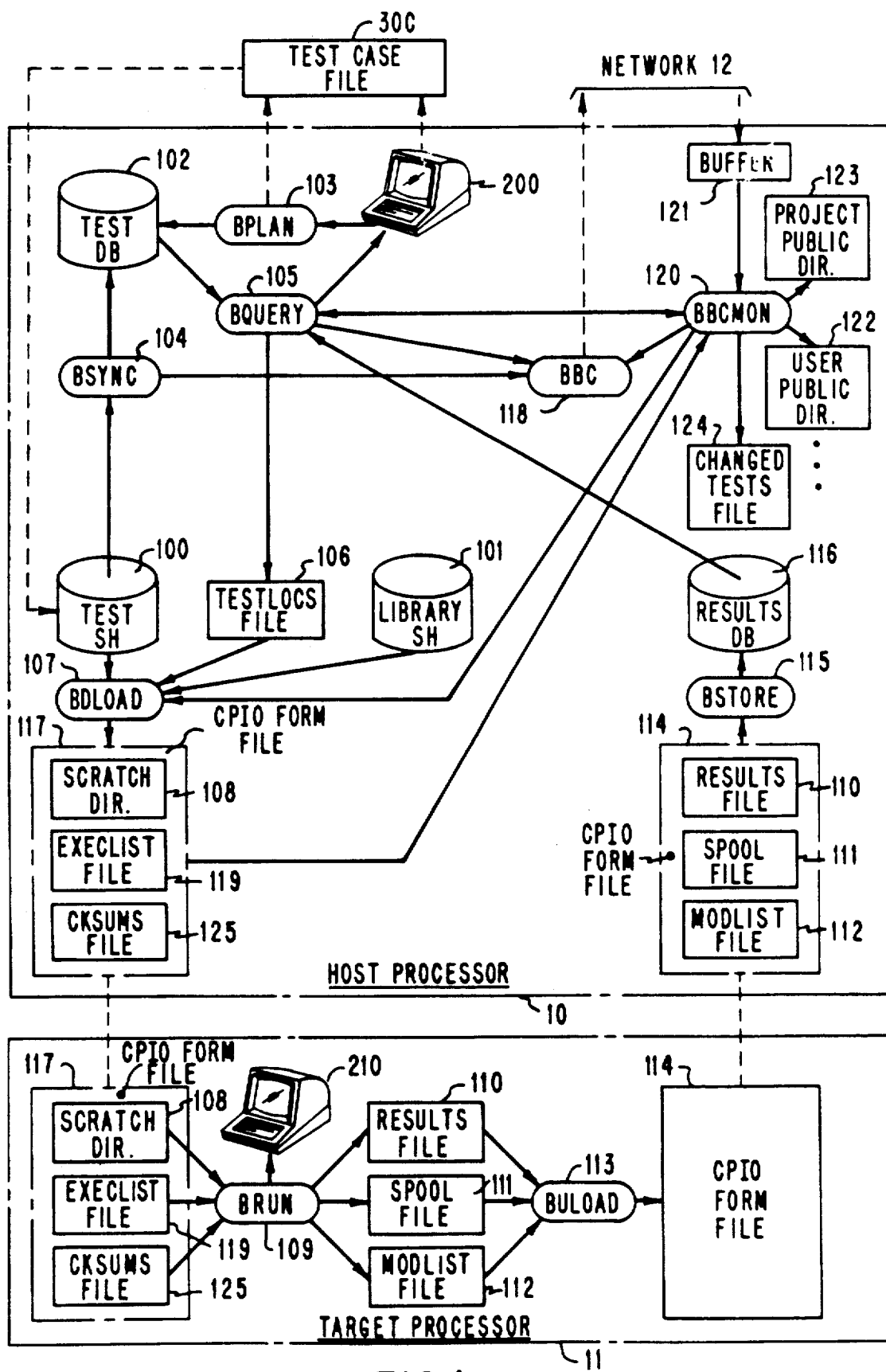
FIG. 1 is a block diagram of an illustrative embodiment of the test automation system of this invention.

FIG. 1 is a block diagram of an illustrative embodiment of the test automation system which is the subject of the invention. The system is a collection of tools designed to improve testing productivity. It simplifies test planning, test selection, test execution, and test results reporting. The system comprises several independent components connected by communication mechanisms. This design allows components to be upgraded or substituted as the needs of a testing organization change. Briefly, this embodiment of the test automation system provides a test storage hierarchy and test information and result databases for test administration, an automated test execution tool, automated results reporting, and interfaces connecting these components. The system focuses on storage, management, execution, and tracking of test processes. It also provides a mechanism for sharing test cases among testing organizations.

The embodiment shown in FIG. 1 supports "native mode" testing, i.e., target processor testing. It is intended for testing of general purpose computers and software running under the UNIX ® operating system of AT&T, by means of executing automated tests or directing the execution of tester-provided shell scripts through a UNIX system shell-level interface. This illustrative example of the test automation system is not intended to assist in the process of developing individual tests.

As FIG. 1 shows, this illustrative example of the test automation system is implemented across two processors: a host processor 10 on which testing strategies are formulated and test descriptions, test files, and test results are stored, and a target processor 11 which is the object of the testing effort and on which selected tests are executed and test results are obtained.

Figure 2:
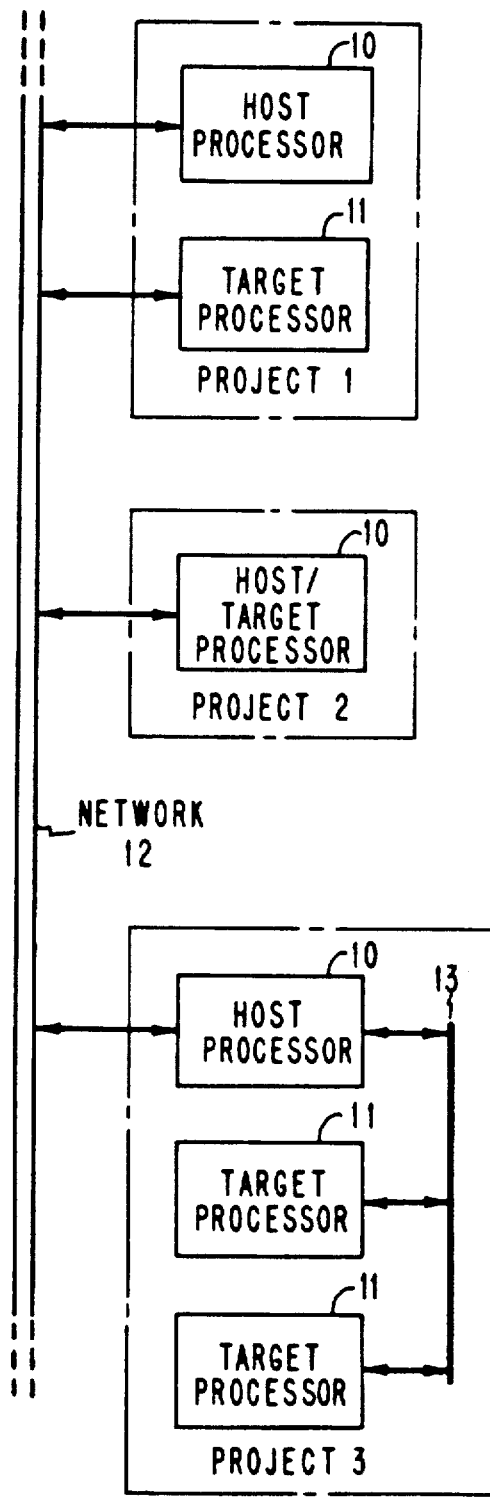
FIG. 2 is a block diagram of a test-sharing arrangement comprising a plurality of test automation systems.

However, this is only one of a number of possible implementations. As FIG. 2 illustrates, the implementation may vary from project to project. Each project's testing organization may select an implementation that best suits its needs. The implementation of FIG. 1 corresponds to the implementation for project 1 in FIG. 2. A different project 2 may implement the test automation system on a single processor—host processor 10—wherein the host processor also serves as the target processor. As such, it is used to test itself. And yet another project 3 may have a plurality of target processors 11 being tested from a host processor 10. Other implementations are possible as well. For example, two or more projects may share a host processor 10, in which case host processor 10 will run multiple incarnations—copies—of the test automation system, one for each project.

For the purpose of enabling test sharing between projects, and thereby obtaining maximum benefit from the capabilities of the test automation system, the test automation systems of a plurality of projects 1-3 are interconnected by a communication network 12, as shown in FIG. 2. The type of network used is irrelevant for purposes of this invention. Network 12 may be used by a project only to communicate with other projects, as in the case of projects 2 and 3. Communications between host processor 10 and a target processor 11 may then be provided by a separate communication path 13, as in the case of project 3. Or, network 12 may be used by a project both to communicate with other projects as well as to communicate between a project's host and target processors, as in the case of project 1.

Returning to FIG. 1, the illustrated component parts of the test automation system will now be described. Briefly, a BPLAN process 103 is used to create test descriptions and store them in a test information database 102. The tests are stored in a test storage hierarchy 100, and a library storage hierarchy 101 stores shared test routines. A BSYNC process 104 completes test descriptions in database 102 from contents of test storage hierarchy 100, and uses a BBC process 118 to communicate notice of test changes to other projects. A BQUERY process 105 is used to examine test descriptions and to select tests for execution. Selected tests are identified by a TESTLOCS file 106. BQUERY process 105 uses BBC process 118 and BBCMON process 120 to communicate with BQUERY processes of other projects and obtain test descriptions or tests from those projects. A BDLOAD process 107 gathers tests identified by file 106 from storage hierarchies 100 and 101 into an output file 117 for downloading to target processor 11. A BRUN process 109 executes downloaded tests on target processor 11, collects test results in files 110-112, and reports result summaries. A BULOAD process 113 assembles contents of files 110-112 into an output file 114 for uploading to host processor 10. A BSTORE process 115 stores uploaded test results in a results database 116. BQUERY process 105 is then used to examine test results collected in database 116.

The test automation system of FIG. 1 is founded on a particular test case format, shown in FIG. 3. This format is based on, but departs from, the ANSI/IEEE Standard 829. The format has a plurality of fields 301-318 that contain information needed by users of the test automation system for each test case. A test case is a set of inputs, expected results, and execution conditions for an object of testing. An object may be hardware, software, firmware, or a combination of these.

Fields 301-318 are defined as follows.

ID field 301: The test's identifier; an identification string as specified in a test design document. Each identifier is unique. It identifies not only the particular test but also the particular incarnation of the test automation system, e.g., a particular project.

ORIGIN field 302: The project and test identifier (ID) of any originating test. A test may have been created locally, or it may have been acquired remotely from another project. The ORIGIN field of a remotely-acquired test contains a project tag (a pointer to the project) and test ID of the original test. For a locally-created test, this field contains only the project tag.

CONTACT field 303: The name of a person responsible for the test case.

REQT field 304: The number of the requirement items (of a project's requirements) that are tested by this test. This field may include the name of, and pointer within a document storage hierarchy to, the requirements document in which the requirement is specified.

TYPE field 305: Either a "manual" test, which is one requiring manual intervention to run to completion, or an "automatic" test, which is one requiring no manual intervention. A manual test may have automatic phases, but requires a manual step and a response from the user to run successfully to completion.

OBJECT field 306: A list of the test objects tested by this test case.

PURPOSE field 307: A short test description.

METHOD field 308: A detailed description of the method used in achieving the purpose of this test. It contains information describing the "hows" and "whys" of this test, and describes the expected behavior of the test to establish the criteria for determining test success or failure.

KEYWORDS field 309: Words or phrases used for test selection. At least one keyword must be from a list of keywords that are global to all projects. (These are stored in a STDINFO database, not shown, which holds information general to all projects' incarnations of the test automation system.) Other keywords may be chosen from a list of keywords that are local to the project (stored in a PROJINFO database, not shown, which contains information descriptive of, and specific to, the particular project).

HCONFIG field 310: Special target processor hardware configuration requirements.

SCONFIG field 311: Special target processor software configuration requirements.

PTIME field 312: The estimated run time of the test procedure.

STIME field 313: The estimated test setup time.

SETUP field 314: The shell script or invocation that performs any target setup actions or checking that are required by this test.

PROCEDURE field 315: The shell script or invocation that constitutes the test procedure. The procedure is a specified sequence of actions for the execution of the test.

CLEANUP field 316: The shell script or invocation that performs any target cleanup required after the test completes.

DEPEND field 317: Identifies the library functions, if any, that must be downloaded with this test.

COMMENT field 318: Any other information which applies to this test.

COUNT field 319: The number of test components that make up the test. Each test comprises one or more test components, each of which is essentially a distinct test having distinct results. Inclusion of a plurality of test components in a single test case file alleviates the costly overhead of making each test component into a separate test, with its own test case file in the test storage hierarchy and with a separate record in test information database.

SETUP, PROCEDURE, and CLEANUP fields 314-316 are the only executable fields of test case format of FIG. 3. ID, STIME, PTIME, TYPE, and COUNT fields 301, 313, 312, 305, and 319, respectively, give values that are used during test execution. The other fields contain data meant only to provide information to persons who may read the test case. The executor process BRUN ignores these fields.

The test case format of FIG. 3 is implemented in a file 300. At minimum, a test case file 300 must include entries for ID field 301 and PROCEDURE field 315.

Returning to FIG. 1, test case files 300 are stored in a test storage hierarchy 100. The hierarchy 100 is a UNIX system directory structure that provides file storage of a project's tests. In the system of FIG. 1, a test is a directory containing all files required for the test, irrespective of whether they are source, executable, or reference files or makefiles. These files may include test case specifications, test execution scripts, and test-related documents. Test case file 300 is typically one file of a number of files under the directory that lists all files—including other directories—pertaining to the test.

Alternately, tests not represented by test case format of FIG. 3 may also be included in the system, and each may be a single file containing the execution script—the procedure—composing the entire test.

A test is a directory. This directory contains a file with the same name as the directory: this file is the test case which contains the execution script for the test. The remaining files are organized in subdirectories. This structure allows for the existence of an arbitrary number of files in an arbitrary number of subdirectories.

Test storage hierarchy 100 is selected, defined, and administered by the project. The test automation system of FIG. 1 imposes no constraints on hierarchy 100 other than that it must start in a single UNIX system directory. The full pathname of the directory that is the base of hierarchy 100 must be made known to the test automation system. Illustratively, this is done by means of an entry in the PROJINFO database referred to earlier. The test automation system does not modify hierarchy 100 in any way. The hierarchy is implemented as a UNIX file system on host processor 10. Files in the hierarchy are modified via editors and are updated via standard UNIX system commands.

Associated with test storage hierarchy 100 is a library storage hierarchy 101. Hierarchy 101 is likewise implemented as a UNIX file system on host processor 10. It stores a library of shared test routines for use in test procedures.

Closely related to test storage hierarchy 100 is a test information database 102 implemented on host processor 10. For purposes of this description, a database is a storage arrangement organized such that it can be searched on the basis of a plurality of criteria. Database 102 contains information describing the tests in storage hierarchy 100. The primary purpose of test information database 102 is to facilitate project test planning and test sharing among projects. Test information database 102 provides a loosely-coupled connection between different projects' test automation systems. The connection permits easy database and test storage hierarchy through remote query capabilities to allow test sharing. The test information database has two somewhat overlapping user views. One supports the planning part of testing. There are fields in the database containing information that allow a planner to determine if any existing tests meet his or her needs, what resources are needed for those tests and, indirectly, what tests need to be written to provide good test coverage. The other view deals with the problem of scheduling the tests. Once the user has chosen a set of tests, the database provides the information needed to acquire those tests, and to determine their status and who to contact for more information.

Database 102 stores test-descriptive information in the form of TESTINFO records, one record per test. The records store test attributes keyed by test ID. Stored attributes include keywords applying to the test, run time, configuration data, and so on. These can be used to provide general information about tests contained in or planned for test storage hierarchy 100, and to produce files to direct downloading and execution of tests on target processor 11. Test information database 102 does not store the tests themselves.

A TESTINFO record 400 of test information database 102 showing its component fields 401-421 is diagramed in FIG. 4. Fields 401-411 and 422 are the same as corresponding fields 301-311 and 319 of test case file 300 and, as will be seen, their contents are generally obtained directly from the corresponding test case file 300. Remaining fields 412-421 are defined as follows.

RUNTIME field 412: The estimated run time of the test procedure, taken to be the sum of the entries in the PTIME field 312 and STIME field 313 of the test case file 300 of FIG. 3.

LOCATION field 413: The path within the test storage hierarchy that leads to this test.

FORMAT field 414: Indicates whether the test is characterized in the standard test case format of FIG. 3.

PENDMRS field 415: Identifies any known problems or modification requests (MRs) that are associated with this test. MRs are used to log problems and to track reported problems through solution proposal, implementation, and documentation.

DESIGNDOC field 416: Complete identification of the test design document.

PROCDOC field 417: Complete identification of the test procedures document; for example, page numbers of relevant pages of a testing manual.

SUPCLS field 418: Indicates the class of support being given to this test: "planning", "inactive", "active", or "private".

LMODBY field 419: Identification of the person who last modified this project's version of this test.

LMODATE field 420: The date on which the test was last modified.

SIZE field 421: The size in number of bytes, of the test files.

A second database included in the test automation system of FIG. 1 is results database 116, which is a collection of test result logs intended to hold the entire testing history of a project. The primary purpose of results database 116 is to allow the tracking of the progress of the project's production testing activity. It provides a view into the testing process which can be used for planning future testing sessions, and to evaluate the present quality of the tested product through test results and test-related metrics. Database 116 is fed test results gathered by the test execution tool. Test results accompanied by test run attributes are stored—keyed—in database 116 by test ID. Stored attributes include run date, elapsed time, and so on. Database 116 stores the result information in the form of RUNINFO records, one record per executed test.

Figure 5:
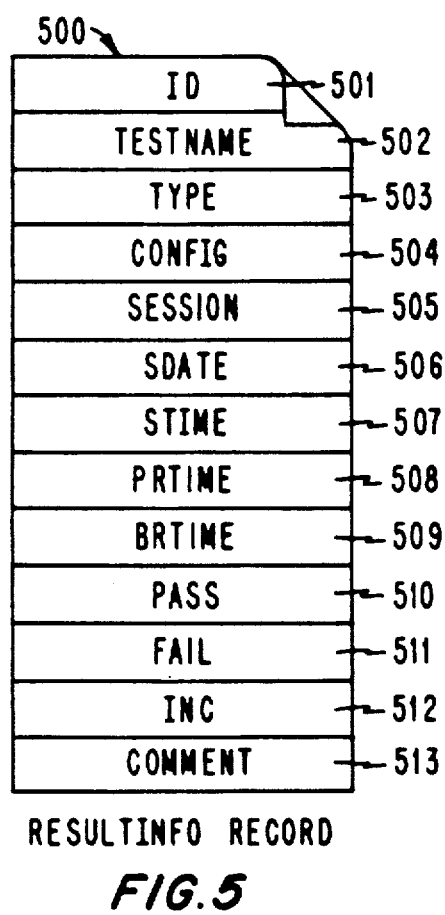
FIG. 5 is a block diagram of a record of results database of FIG. 1.

A RUNINFO record 500 of results database 116 showing its component fields 501-513 is diagramed in FIG. 5. Fields 501-513 are defined as follows:

ID field 501: The identifier of the test; identical to fields 301 and 401 of FIGS. 3 and 4.

NAME field 502: The UNIX system file structure base name of this test; it is the last component in the pathname of the test.

TYPE field 503: The type of test, assigned as follows:

DEBUG: The test execution tool was invoked with a flag indicating that a debug run is intended.

MODIFIED: The test execution tool was invoked without a debug flag and the test execution tool determined from internal checksums that the test had been modified since it was downloaded from the test storage hierarchy.

UNOFFICIAL: The test execution tool was invoked without a debug flag and the test execution tool could not find a reference checksum for the test. This can occur when a test developer is creating tests on the target processor and manually adding them to an EXECLIST file 119 (described below).

OFFICIAL: The test execution tool was invoked without a debug flag and the test execution tool matched the reference checksum to the test.

CONFIG field 504: The configuration of target processor when the test was run; the value of a user-defined $CONFIG environment variable, if one has been provided by the user, which describes the hardware and software environment.

SESSION field 505: A unique identifier which indicates in which session the test was run. Contains the lab name and a uniqueness code.

SDATE field 506: The date on which execution of the test started.

STIME field 507: The time at which execution of the test started.

PRTIME field 508: The amount of time taken up by execution of PROCEDURE.

BRTIME field 509: The total amount of time taken up by execution of the test, including execution of SETUP, PROCEDURE, and CLEANUP.

PASS field 510: The count of the number of test components in this test that passed test.

FAIL field 511: The count of the number of test components in this test that failed test.

INC field 512: The count of the number of test components in this test for which results were inconclusive.

COMMENT field 513: Any other optional information relating to the test's execution; for example, a possible problem code from the test execution process BRUN.

Any relational database management system may be used to control databases 102 and 116; for example, the UNITY or UNITS database programs of AT&T or the INGRES database program of AT&T and Relational Technology, Inc. are suited for this task.

The test automation system supports the activities of test planners, test developers, test administrators, and testers.

A test planner uses test information database 102 to select tests to be run during production testing and to monitor the process of test development. Test files are prepared for use by production testers to meet criteria selected by the test planner. Results database 116 is then used to extract testing progress information and metrics for evaluation of system reliability and failure intensity.

The test developer prepares tests in test case format of FIG. 3 for use in production testing. The developer begins with a test case template which he or she then fills in. The test can be debugged on any appropriate target machine. BDLOAD process 107—the download tool—is used to package the tests for taking from host processor 10 to any target processor 11. BRUN process 109—the execution tool—and BULOAD process 113—the upload too—are used to support the running of the tests during debugging, and the collecting of modified tests, for return to host processor 10.

In production testing, the tester runs tests on target processor 11 and returns results to host processor 10. In order to run the tests, the tester makes sure that the tests and the execution environment are available on target processor 11. The environment includes executables of the test automation system that must be present on target processor 11, and shell variables used by those executables and set to specific values (for example, specific directory locations). The tester uses the BDLOAD process 107 to collect the required tests, and the executables if required, into an output file. After moving the output file to target processor 11 and re-creating the original test and executable structures there, the tester invokes BRUN process 109 to run the tests. He or she then uses BULOAD process 113 to prepare an output file containing the test session results for transfer to host processor 10.

An administrator then uses BSTORE process 115—the results recording tool—to enter the results into results database 116.

Figure 6:
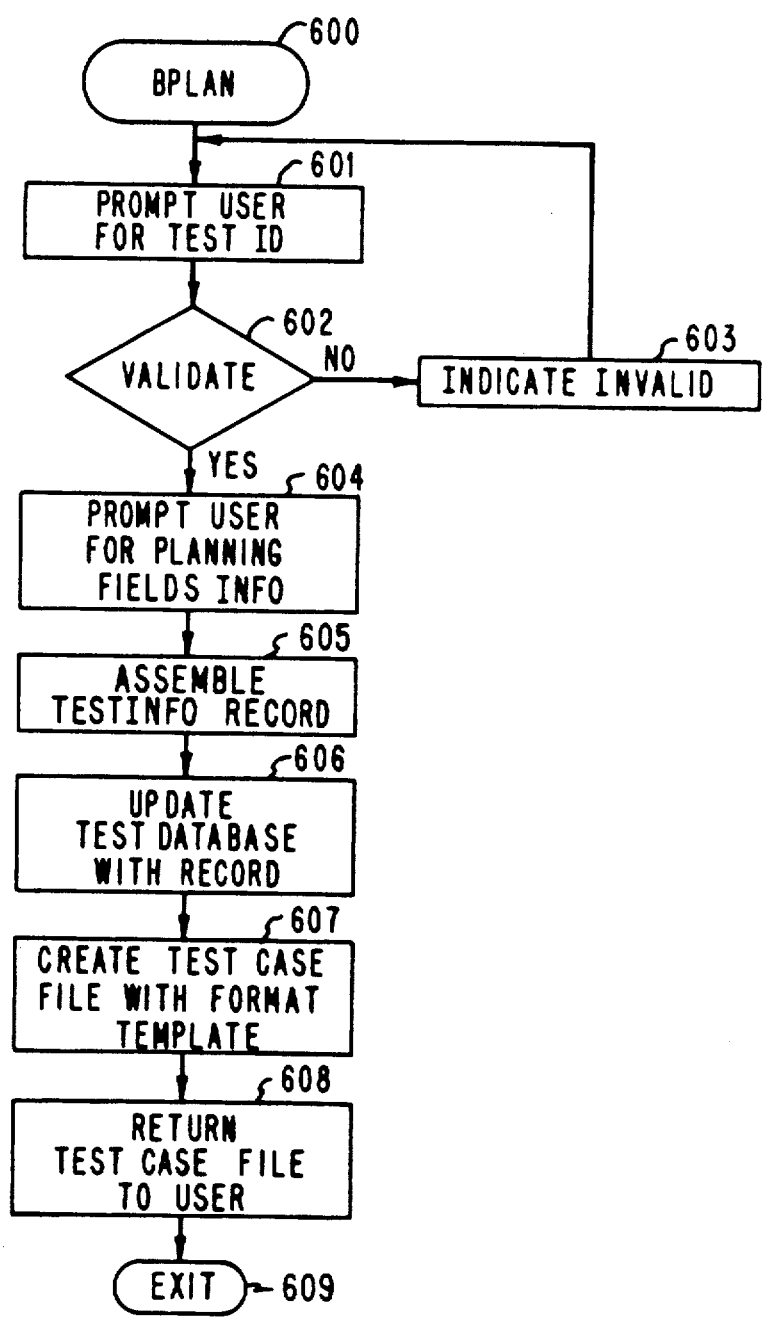
FIG. 6 is a flow diagram of BPLAN process of FIG. 1.

The test development and planning tool of the test automation system is the BPLAN process 103. Invoked on a terminal 200 of host processor 10, its job is to create entries in test information database 102 for each test. It fills with information various fields—principally test planning fields—of a TESTINFO record 400 and provides to the user a template (an empty copy) of test case file 300 with the fields that are obtainable from record 400 filled in. BPLAN process 103 is flowcharted in FIG. 6.

Upon being called by the user, at step 600, BPLAN process 103 prompts the user for the ID of the test that is being entered into the system, at step 601. Upon receipt of an ID, process 103 checks whether the ID is valid, at step 602. For example, process 103 checks the database 102 to determine whether this ID has already been used. If validation fails—e.g., the ID is not unique—process 103 so informs the user, at step 603, and then re-prompts the user for an ID at step 601.

If validation succeeds, process 103 prompts the user for information for the planning fields, at step 604. These are fields 407 and 413-420 of TESTINFO record 400. Once it is provided with the planning information, process 103 assembles in processor memory a TESTINFO record 400, at step 605. Record 400 includes the ID obtained at step 601 and the planning information obtained at step 604. Process 103 then updates test information database 102 with record 400, at step 606, by issuing an appropriate command to the database management system. The database management system inserts record 400 into database 102.

Process 103 also creates test case format of FIG. 3, at step 607, by creating in memory of processor 10 a file 300 containing a template of the test case format and filling in, from information obtained at steps 601 and 604, ID field 301 and PURPOSE field 307. Process 103 then returns test case file 300 to the user, at step 608, by issuing a message informing the user of the file ID and pathname of the test case file 300. Process 103 then exits, at step 609.

Once provided with the template of test case format of FIG. 3, a test developer completes it by editing its fields 302-306 and 308-318 to enter therein the requisite information. The developer may use any convenient on-line editor for this purpose, such as the UNIX system visual editor (VI).

When requisite fields of file 300 are filled in, a system administrator uses conventional UNIX system commands to enter completed test case file 300 in test storage hierarchy 100, at the location specified by LOCATION field 413 of the test's TESTINFO record 400. (In practice, a project typically imposes some change control mechanism to limit changes to those approved by the project as tracked by modification requests.) The administrator then invokes, on terminal 200, a BSYNC process 104 of the test automation system of FIG. 1.

Figure 7:
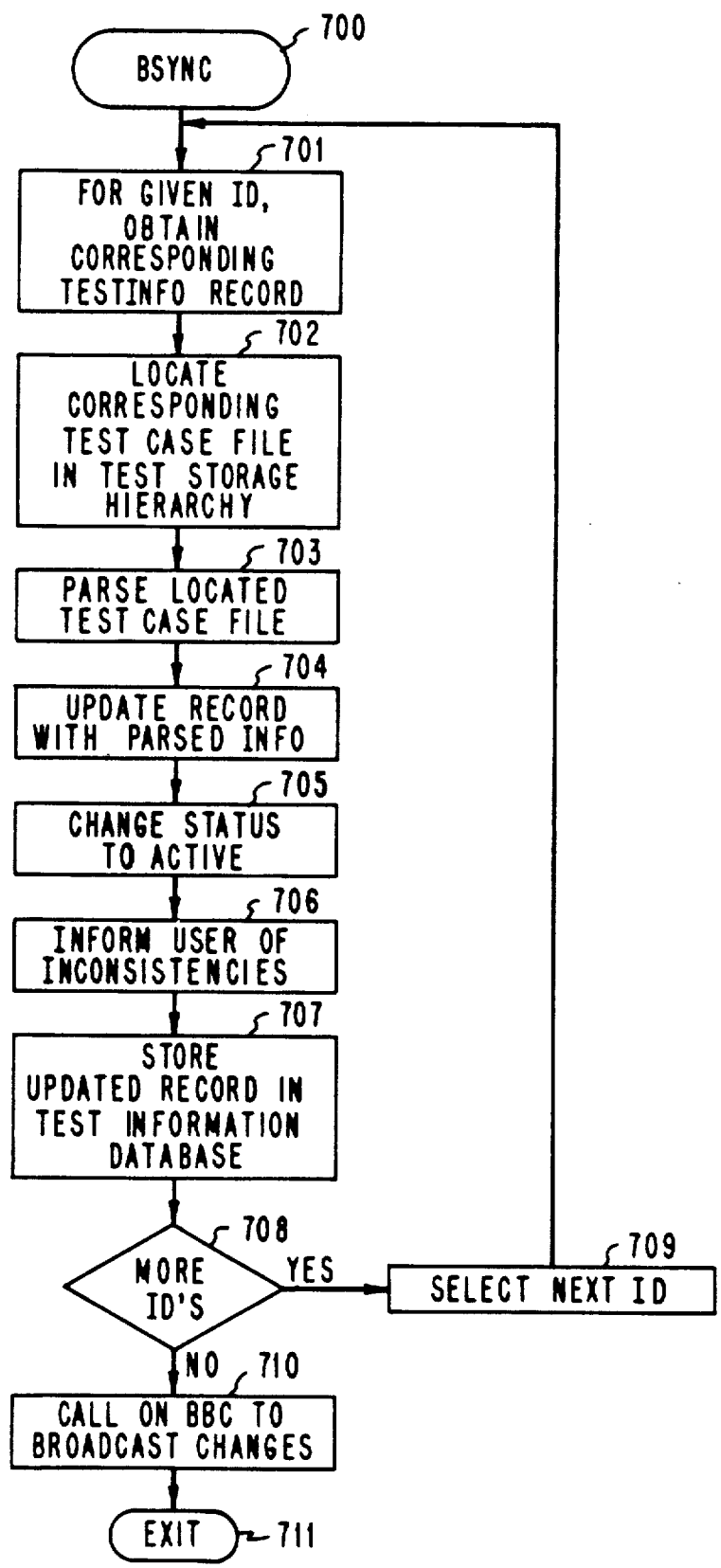
FIG. 7 is a flow diagram of BSYNC process of FIG. 1.

BSYNC process 104 is a test information extraction and update tool. The job of BSYNC process 104 is to parse—examine and break into component pieces—test files found in test storage hierarchy 100 to extract therefrom information for populating fields of records 400 in test database 102. Integrity of database 102 is maintained through this extracted data; conflicts between data in database 102 and storage hierarchy 100 are resolved in favor of data in hierarchy 100. The BSYNC process is flowcharted in FIG. 7.

As part of the call of the BSYNC process 104, process 104 is passed one or more test IDs. In response to the call, at step 700, process 104 takes one of the received IDs and obtains from test database 102 the corresponding TESTINFO record 400, at step 701, by calling on the database management system to do a lookup of the ID in test database 102. From the record 400, process 104 obtains the LOCATION field 413, which it uses to file 300 from test storage hierarchy 100, at step 702. At step 703, process 104 parses test case file 300 obtained at step 702 in order to extract therefrom information required to complete record 400 obtained at step 701. At step 704, process 104 updates record 400 with the extracted information. Record 400 is now complete and up to date, and process 104 sets the record's SUPCLS field 418 to "active", at step 705, to indicate that the corresponding test is ready for use. (Since BSYNC process 104 may be used to update database 102 with changes to existing active tests, the SUPCLS field 418 may already have been set to active.) While updating record 400 at step 704, if process 104 detects any inconsistencies between information originally stored in record 400 and the information obtained from test case file 300, it overrides the original information and informs the user of any such inconsistency, at step 706. Process 104 then updates test information database 102 with completed record 400, at step 707, by calling on the database management system to insert record 400 in database 102.

Process 104 now checks if it has received any other IDs for which it has not performed the procedure of steps 701-707, at step 708. If so, process 104 selects the next ID, at step 709, and returns to step 701 to perform the procedure of steps 701-707 for that ID.

If it has gone through all received IDs, process 104 places the IDs in a file and calls upon BBC process 118 of FIG. 13 (discussed further below) to broadcast the file over network 12 to other projects to inform them that there has been a change in the tests identified by the file, at step 710. It does not matter whether the changes are due to test additions, test changes, or edits to correct database problems. Process 104 then exits, at step 711.

Following performance of BSYNC process 104, a test is available to a tester for use.

A tester typically begins using the test automation system of FIG. 1 by invoking BQUERY process 105. Process 105 is a multi-functional database query tool whose main purpose is to insulate the tester from whatever database management system has been chosen to implement the system's databases. Process 105 provides interactive access to the database files. For example, the interactive mode may provide direction to create queries and guidance to the various record fields and databases. Process 105 is used to obtain from databases 102 and 116 information about tests and test results. A primary use of process 105 is to select for execution tests that possess some desired characteristics. Another use is formatting and printing of reports from a database. Process 105 also interacts with other project's databases, by means of BBC process 118.

BQUERY process 105 is most commonly used in an interactive way: process 105 issues a sequence of prompts to determine a user's intentions. The user enters short replies to these prompts, which then affect what additional information BQUERY must gather, and hence affect the nature of further prompts which BQUERY must submit. But BQUERY process 105 may also be provided with the pre-prepared information, held in a conventional UNIX file, which supplies, one-per-line, answers to the prompts which otherwise BQUERY would solicit one-at-a-time. In this "batch" mode of operation, BQUERY gets all its information from successive lines of the file, and no interaction with the user takes place. To facilitate the batch mode, and to make possible a repeat of a previous interactive session, BQUERY provides a "keep" option which arranges that the user's responses to interactive prompts be recorded, one-per-line in a "keep" file which is suitable for resubmission to BQUERY for a batch-mode repeat of the session. A user may modify a "keep" file to cause BQUERY to perform a modified session; for example, a "keep" file produced as a result of an interactive session for displaying certain fields of selected TESTINFO records 400 may be altered so that other or additional fields are displayed in a modified session.

Figure 8:
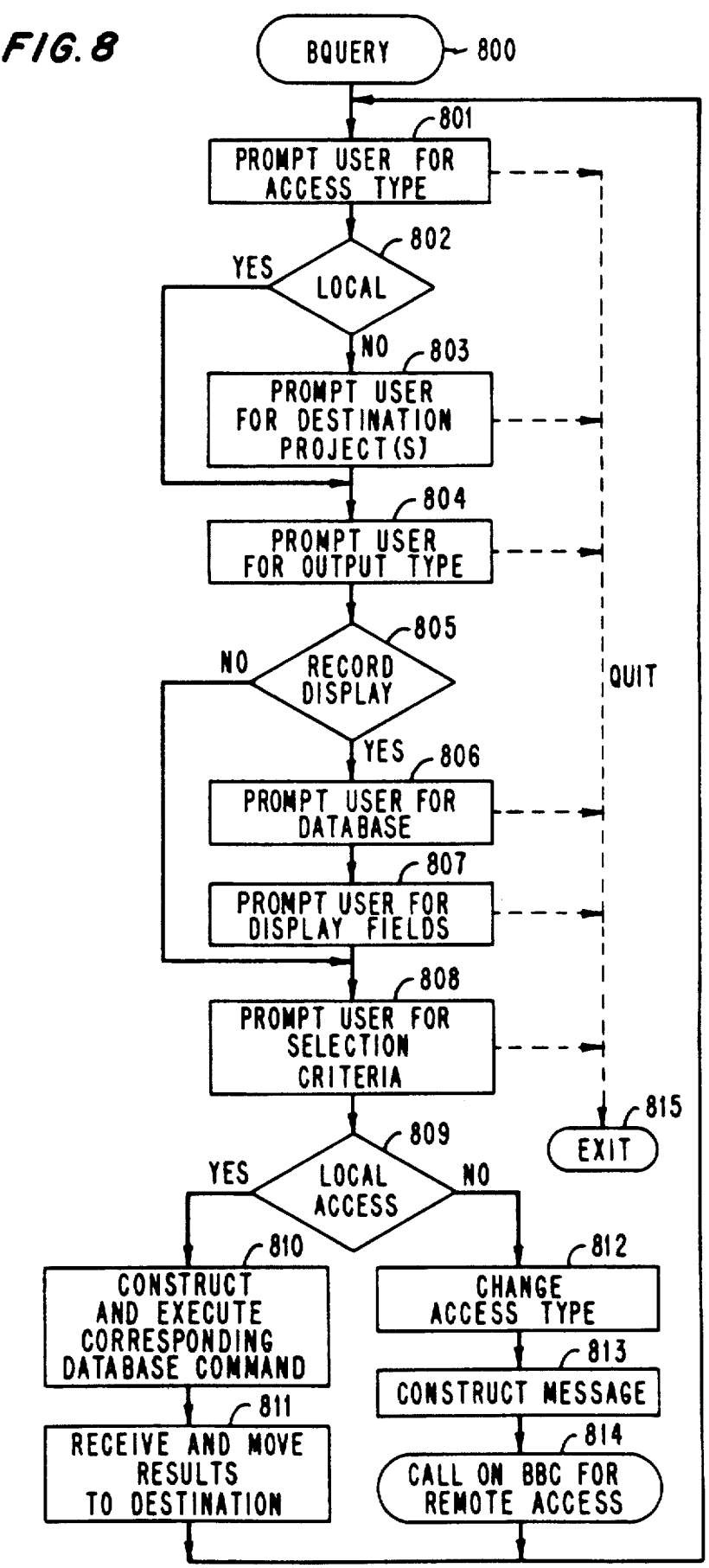
FIG. 8 is a flow diagram of BQUERY process of FIG. 1.

BQUERY process 105 is flowcharted in FIG. 8.

Upon being called by a user, at step 800, process 105 questions the user by means of prompts to determine what the user desires. At step 801, process 105 prompts the user for access type to determine whether access to this project's database or test storage hierarchy—a local access—is desired, or whether access to a database or storage hierarchy of another project—a remote access—is desired. If the user selects remote access, process 105 begins saving user responses in a "keep" file, described above, for later use as a batch-mode input to a BQUERY process of a remote project. If desired access is remote, as determined at step 802, process 105 prompts the user at step 803 for the names of one or more remote projects whose database or hierarchy is sought to be accessed. Following step 803, or if the desired access was determined to be local at step 802, process 105 prompts the user for the desired output type, at step 804. The output may be one of four types: horizontal record display, which is a display of TESTINFO or RUNINFO records in the same format in which they are stored in databases 102 or 116; vertical record display, which are the same records formatted for display and with every field identified by name; the tests themselves in the case of a remote access; and a TESTLOCS file 106 in the case of a local access. If the output type is determined to be record display at step 805, process 105 prompts the user for the database—whether test information database 102 or results database 116—that the user wishes to access. And at step 807, process 105 prompts the user for display fields—which fields of the selected TESTINFO record 400 or RUNINFO record 500 the user wishes to have displayed for review.

Following step 807, or if the output type was determined not to be record display at step 805, process 105 prompts the user for the selection criteria for selecting records from the indicated database, at step 808. For example, a selection criterion may be a keyword of KEYWORDS field 409. (If the output type selected at step 804 is the tests themselves or TESTLOCS file 106, only LOCATION field 413 of selected TESTINFO records 400 will be of any interest.)

Having obtained answers to its prompts, further action of process 105 depends on whether local or remote access was requested, as indicated at step 809. If the access is local, process 105 constructs a database command on the basis of the answers given to the prompts, and causes the database management system to execute the command on either database 102 or 116, at step 810. When the database management system returns to process 105 with results of the access, process 105 transfers the results to the intended destination, at step 811. The destination is the screen or printer of terminal 200 if the user indicated a record display output type at step 804, or a TESTLOCS file 106 if the user so indicated at step 804. Process 105 then returns to step 801 to cycle through the prompts anew.

Figure 13:
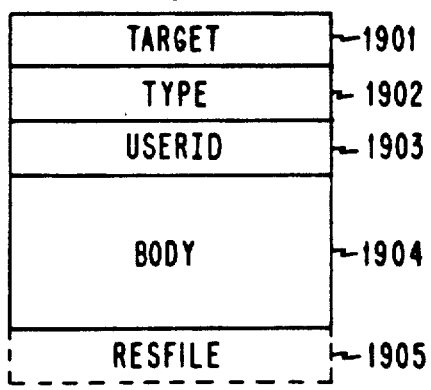
FIG. 13 is a block diagram of a message sent between test automation systems of FIG. 2.

If the access is remote, as determined at step 809, process 105 changes the response to the access type prompt of step 801 recorded in the "keep" file from "remote" to "local," at step 812, constructs a message the body of which includes the "keep" file containing the recorded user responses to the prompts, at step 813, and calls on BBC process 118 of FIG. 13 to perform the remote access, at step 814. The message is passed to process 118 as part of the call. Process 105 then returns to step 801.

A user may terminate and exit BQUERY process 105 at any time, at step 815, merely by giving a response "quit" to any one of the prompts. But in selecting tests for execution, a user typically cycles through BQUERY process 105 a number of times, in each case requesting to view the results of his or her request on the screen of terminal 200, so that he or she may examine characteristics of tests that various selection criteria extract. On that basis, the user chooses selection criteria for tests that he or she wishes to run. Having chosen the criteria, the user requests process 105 to place a list of tests satisfying those criteria in a TESTLOCS file 106. A TESTLOCS file 106 is a UNIX system file and data format used as an interface between process 105 and a BDLOAD process 107. It is a simple list of tests in test storage hierarchy 100 that are to be downloaded to target processor 11, identified by test location (pathname) relative to the base of storage hierarchy 100 (contents of LOCATION field 413).

Once the user has created the TESTLOCS file 106, by means of BQUERY process 105 and/or by means of manually inserting therein pathnames of test case files 300, the user invokes BDLOAD process 107 to collect tests specified by TESTLOCS file 106 into an output file for downloading to target processor 11. Process 107 takes TESTLOCS file 106 as an input, extracts test files for the tests identified therein from test storage hierarchy 100, and places the test files into a conventional UNIX system CPIO format file for the user to transport to target processor 11 for execution. BDLOAD process is flowcharted in FIG. 9.

Upon being called, at step 900, process 107 checks whether the user is working in a scratch—an empty—directory 108, at step 901. If not, process 107 so notifies the user, at step 915, and prompts the user for input on whether to exit or proceed, at step 916. If the response is to exit, as determined at step 917, process 107 exits at step 918. If the response is determined at step 917 to be to proceed, process 107 continues operation at step 904 and treats the given directory as a scratch directory.

At step 904, process 107 reads contents of TESTLOCS file 106 to determine what tests are being called for. Process 107 checks all entries of TESTLOCS file 106 to make sure that they are valid, at step 905. For example, process 107 checks all test pathnames to make sure that the tests exist. If all entries are not valid, process 107 so notifies the user, at step 902.

Following step 902, or if all entries of TESTLOCS file are valid, process 107 copies one-by-one the valid tests identified in TESTLOCS file 106 from test storage hierarchy 100 into scratch directory 108, at step 906. Process 107 then examines the copied tests to determine if any of them make use of any library test routines, at step 907, and copies the necessary library routines from library storage hierarchy 101 to scratch directory 108, at step 908. Alternatively, process 107 may automatically include the whole hierarchy 101 in directory 108.

Next, process 107 checks whether "executables" are required, at step 99. Executables are programs, such as a test execution tool, that enable tests to be run on target processor 11. Executables are required, for example, when the operating environment of target processor 11 is not equipped to support testing and does not include the executables. Whether or not executables are required is specified directly as part of the call to process 107. If executables are required, process 107 finds them stored at a place pointed to by a pointer of the PRO- JINFO database referred to earlier, and copies them into scratch directory 108, at step 910. Process 107 then computes a checksum value for each test identified in TESTLOCS file 106 and stores the computed values in a CKSUMS file 125, at step 911. Illustratively, the checksum values are computed by invoking the conventional SUM command of the UNIX operating system. The computed checksum values are used later to verify integrity of downloaded tests. Further, processor 107 creates an EXECLIST file 119 for the tests identified by TESTLOCS file 106, at step 912. EXECLIST file 119 is a file and data format used as an interface between the BDLOAD process 107 and BRUN process 109. It contains the list of tests to be run, identified by test location within scratch directory 119. The list also serves to specify the tests' execution order to BRUN process 109.

If host processor 10 is also the target processor, tests may be executed directly from scratch directory 108. But if target processor 11 is a separate processor, contents of scratch directory 108 must be transferred to processor 11 for execution. Therefore, at step 913, process 107 checks options that accompanied its call at step 900 to determine whether a request has been made to create a CPIO format file. This is an output file suited for inter-processor transfers. If a CPIO format file was requested, process 107 creates CPIO format file 117, at step 914, including therein scratch directory 108, EXECLIST file 119, and CKSUMS file 125. CPIO format file 117 is created by invocation of the conventional UNIX system CPIO command. Following step 914, or if a CPIO format file was not requested, process 107 exits, at step 915.

If host processor 10 is not the target, following creation of CPIO format file 117, the tester transfers the file to target processor 11 in a conventional manner. For example, the tester may accomplish the transfer electronically, via a communication medium interconnecting processors 10 and 11. Or, he or she may do so manually by writing CPIO format file 117 onto a medium, such as a magnetic tape, and physically transporting the medium to processor 11.

Having transferred the CPIO format file 117 to target processor 11, the tester re-creates a copy of scratch directory 108, EXECLIST file 119, and CKSUMS file 125, on processor 11, by means of the UNIX CPIO command.

Now that the scratch directory 108 is reproduced on the target processor 11, the tester sets up the environment on target processor 11 necessary for executing tests, if such an environment is not in existence. These activities involve, for example, changing the user's working directory to the scratch directory 108 on processor 11, and making BRUN process 109, BULOAD process 113, and other executables, known to the UNIX system shell on processor 11 so that they may be run. Illustratively, the latter may be accomplished by setting values for UNIX system environment variables $CONFIG, referred to earlier, $PATH, and $BUSTER.

$PATH specifies a sequence of directory names in which the shell may look for processes that the user wants to execute.

$BUSTER is a variable specific to the test automation system. It specifies the location on target processor 11 of the executables of the test automation system of FIG. 1.

Figure 10:
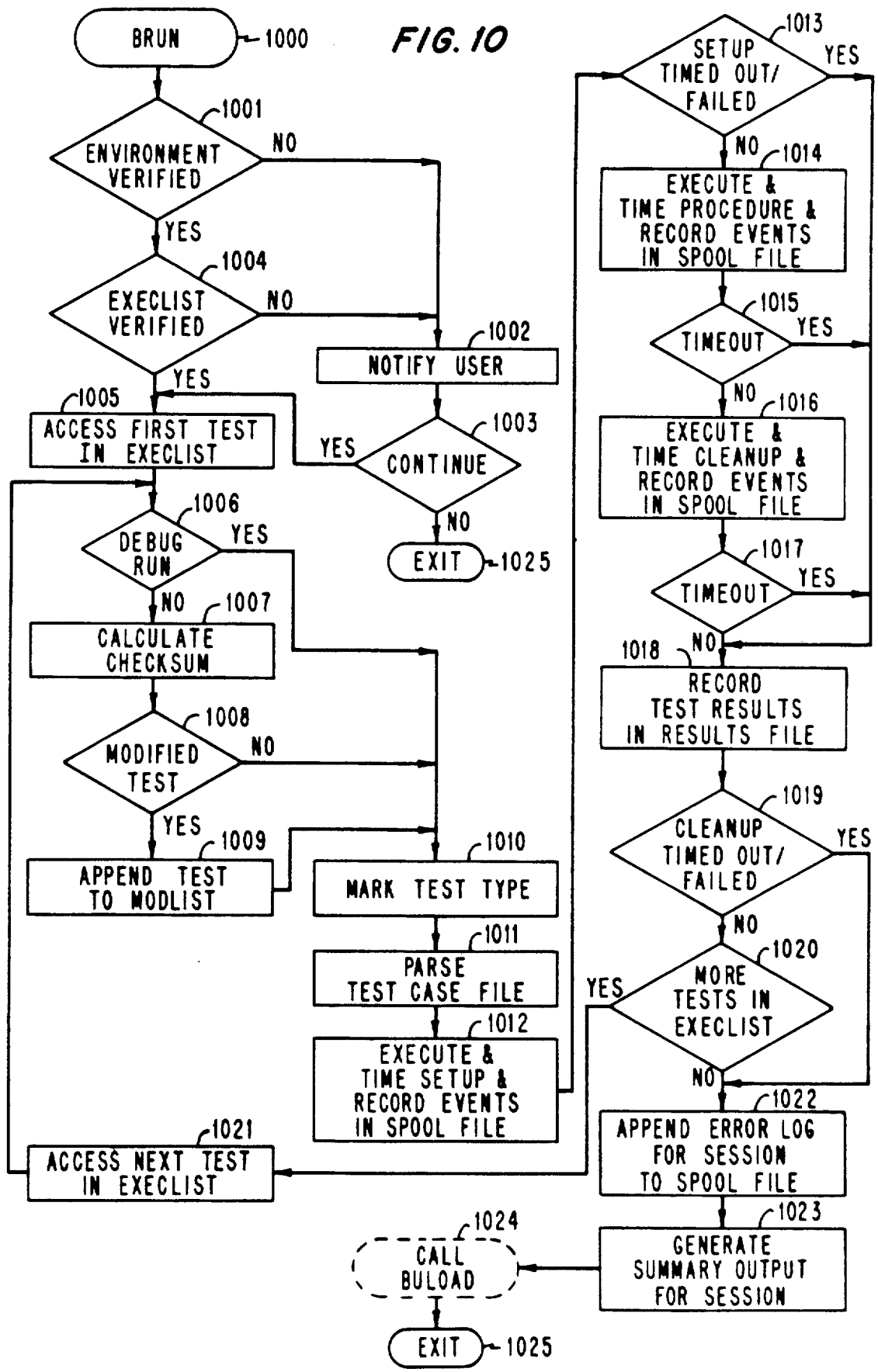
FIG. 10 is a flow diagram of BRUN process of FIG. 1.

To execute the tests, the tester invokes BRUN process 109 on processor 11. Process 109 is the test executor. Process 109 provides the facility to administer the execution of tests and to collect both the results of the tests and a record of what target processor 11 was doing during test execution. Process 109 uses EXECLIST file 119 and the copy of the tests from scratch directory 108 to execute the tests. The executable part of the test comprises shell scripts or other executable processes. Process 109 parses test files and executes the SETUP, PROCEDURE, and CLEANUP shell scripts or processes for each. Process 109 keeps track of each test's results and records them in a session RESULTS log file Each invocation of BRUN process 109 defines a test session. Process 109 assigns a unique identifier to each session and labels all files that it generates that are associated with that session with the identifier. The identifier comprises a project tag followed by a uniqueness code. BRUN process 109 is flowcharted in FIG. 10.

Upon being called, at step 1000, BRUN process 109 verifies that the environment of target processor 11 is proper—adequate and sane—for execution of tests. For example, process 109 checks whether UNIX system environment variables $BUSTER and $CONFIG, referred to previously, are set. If the environment does not verify, process 109 generates a message to so inform the tester, at step 1002, and then determines whether it is able to continue operating, at step 1003. Illustratively, process 109 cannot continue if the $BUSTER variable is not set. If it cannot continue, process 109 exits at step 1025.

If the environment does verify, or if process 109 determines at step 1003 that it can continue, process 109 reads EXECLIST file 119 and verifies it, at step 1004, essentially making sure that each test identified in EXECLIST file 119 exists in scratch directory 108 or that a path leads to it from directory 108, and that the test is readable. If EXECLIST file 119 does not verify, process 109 so informs the user, at step 1002, and then exits, at step 1003.

If EXECLIST file 119 does verify, process 109 accesses the first test listed in EXECLIST file 119, at step 1005. Process 109 checks options specified as part of the process call at step 1000 to determine whether a debug run is specified, at step 1006. If not, process 109 computes a checksum value for the accessed test, at step 1007, in the same manner as BDLOAD process 107 computed the checksum at step 911. Process 109 then searches through CKSUMS file 125 looking for the accessed test's entry therein. If it finds a checksum entry for the test in file 125, it compares that entry with the checksum value calculated at step 1007, at step 1008. If the two are not equal process 109 writes the test's name to a MODLIST file 112 for the session, at step 1009. MODLIST file 112 is a list of all files run during the session that are considered to have been modified from the originals extracted from test storage hierarchy 100. At step 1010, process 109 also marks the test as being "modified". The mark will be recorded in the test's record in a RESULTS log file 110 that process 109 creates for the session, at step 1018.

If at step 1008 process 109 finds that the calculated checksum and the CKSUMS file 125 entry for the test are equal, it marks the test as being "official".

And if at step 1008 process 109 cannot find either an entry for the test in CKSUMS file 125, or cannot find CKSUMS file 125 itself, it marks the test as being "unofficial".

If a debug run was found to be specified at step 1006, process 109 skips steps 1007–1009 and continues operation at step 1010, where it marks the test as being "debug".

At step 1011, process 109 parses test case file 300 to obtain from test files the SETUP, PROCEDURE, and CLEANUP shell scripts or processes. Process 109 then causes these scripts or processes to be executed on processor 11, at steps 1012 et seq.

The SETUP script or process is user-defined; it may not even exist, and if it exists, it may either be fully automatic or include manual steps. Illustratively, execution of the SETUP script or process, at step 1012, verifies that required files are available on processor 11. Required files are, for example, test files, files of specific executables, and output files of previous tests that this test will use as input. SETUP also performs all steps necessary to prepare for execution of the test procedure itself. For example, SETUP may compile the PROCEDURE executables. If SETUP fails, as determined at step 1013, the test is rendered inconclusive and is not run. In any case, results of SETUP execution are recorded in the test's record in RESULTS file 110, at step 1018.

If execution of SETUP is successful at step 1013, execution of PROCEDURE script or process follows, at step 1014. Execution of PROCEDURE may be either fully automatic, or may involve manual steps. If written in an automated fashion, the test is run and the results are tallied completely unattended. If the test is written with embedded manual steps, process 109 works through the test, pausing when specified to guide the tester through the manual phases as dictated by the test shell script.

Execution of PROCEDURE script or process returns different codes to indicate pass, failure, or inconclusiveness of the test. These results are recorded in the test's record in RESULTS file 110, at step 1018. Because a test may comprise a plurality of components each having its own result, the execution environment provides routines for accounting for multiple pass or fail events in one test; PASS, FAIL, and INC (inconclusive). Illustratively, BRUN process 109 accesses COUNT field 319 of test case file 300 to obtain the expected number of results, while the test script calls PASS, FAIL, or INC to report each component's result. A warning is output on terminal 210 of target processor 11 if the script returns with the sum of PASS, FAIL, and INC not equal to the value declared by COUNT. The warning is also recorded in spool file 111.

Process 109 also imposes time limits on execution of the scripts. Illustratively, time limits on SETUP and PROCEDURE are specified by STIME field 313 and PTIME field 312, respectively, of test case file 300, while the time limit on CLEANUP is predetermined for the system. When process 109 begins script execution, it also commences timing of the specified time limit, at steps 1012, 1014, and 1016. If at steps 1013, 1015, or 1017, the time limit times out before execution of the script is completed, process 109 terminates script execution and marks the test result as inconclusive in the test's record in RESULTS file 110, at step 1018.

To provide a record of what target processor 11 was doing during test execution, process 109 records any input and output (I/O) transfers performed during the test session in a spool file 111, at steps 1012, 1014, and 1016. Spool file 111 is a session log of all input and output of the entire test session.

As mentioned above, process 109 records the results of test execution in RESULTS log file 110, at step 1018. Process 109 collects in RESULTS file 110 the identity of each test that is run, the status of the test—official, modified, unofficial, or debug, —the system configuration for the test, the elapsed time for each test, and test completion status. The result of the test is recorded as three numbers recording the number of passing, failing, and inconclusive test components. If a script is terminated for exceeding its specified execution time limits, that fact is also recorded in RESULTS file 110. RESULTS file 110 is in the form of RUNINFO records 500 of results database 116. Each test executed during the test session has an associated record in RESULTS file 110.

Execution of PROCEDURE at step 1014 is followed by execution of CLEANUP procedure or script, at step 1016. Like SETUP, CLEANUP is user-defined. Execution of CLEANUP deletes intermediate or output files and executables that are no longer needed, and otherwise places target processor 11 in the state in which it was prior to execution of PROCEDURE. CLEANUP thus prepares processor 11 for execution of the next test of the session. If a determination is made at step 1019 that execution of CLEANUP timed out or otherwise failed, there is no guarantee that processor 11 is ready to execute other tests. The test session is therefore ended. A record of CLEANUP having failed will have been made in RESULTS file 110 at step 1018.

After completing execution of a test—including successful execution of CLEANUP—process 109 checks whether there are more tests listed in the EXECLIST file 119, at step 1020. If so, process 109 accesses the next test in the EXECLIST, at step 1021, and repeats steps 1006-1019 for this test. Process 109 repeats steps 1006-1019 for each test listed in EXECLIST file 119. Optionally, a user may specify that execution of the tests listed in EXECLIST file 119 be repeated a specified number of times, to provide a background load or soak function.

Upon finding at step 1020 that all tests have been executed, or upon finding at step 1019 that CLEANUP timed out or otherwise failed, process 109 ends the test session, and appends information gathered in an error log for this test session to the session's spool file 111, at step 1022. From the test results recorded in RESULTS file 110, process 109 creates a summary of the test session, at step 1023, which it writes to standard output. For example, process 109 outputs the summary to the user as a display on a terminal 210 screen of target processor 11. Process 109 also includes a copy of the summary in the session's spool file 111. Illustratively, the summary formats RESULTS file 110 and lists the pathnames of RESULTS file 110, spool file 111, and MODLIST file 112, and a test session identifier. Optionally, at step 1024, process 109 then automatically calls BULOAD process 113, which is a results uploader. Alternatively, process 113 will be called manually by the tester after termination of process 109. Process 109 then exits, at step 1025.

Figure 11:
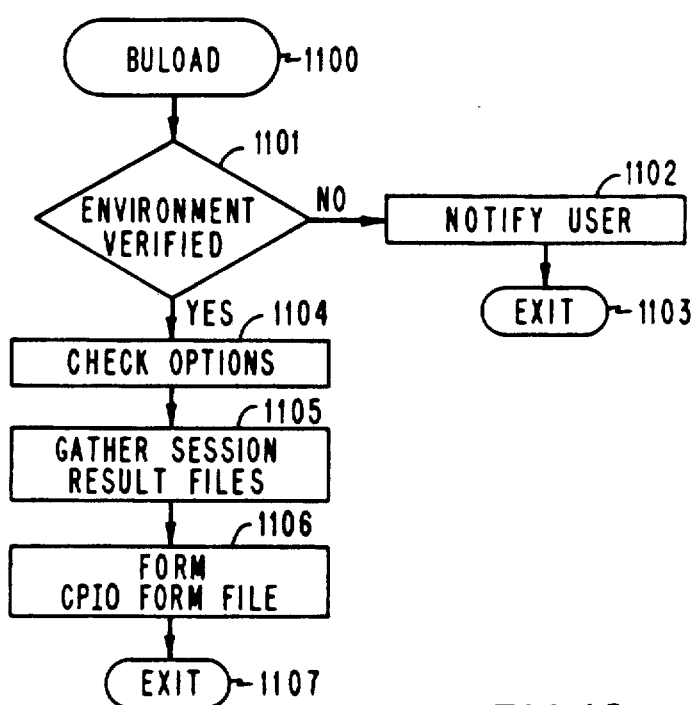
FIG. 11 is a flow diagram of BULOAD process of FIG. 1.

BULOAD process 113 is a results uploader. It collects the RESULTS, spool, and MODLIST files 110-112 into a CPIO format file 114 for easy transfer to host processor 10. BULOAD process 113 is flowcharted in FIG. 11.

Upon being called, at step 1100, process 113 verifies the environment of target processor 11, at step 1101. This is a repeat of step 1001 of FIG. 10. It is performed to verify that the environment is proper to complete the upload successfully. If the environment does not verify, process 113 notifies the user thereof, at step 1102, and then exits, at step 1103. If the environment does verify, process 113 checks options specified as part of its call, at step 1104, to determine what results of the session are required to be reported. Such options are, for example, whether the session's spool file 111 or MODLIST file 112 are to be included as part of the reported results. Process 113 then gathers the desired result files, including RESULTS file 110 and other files specified by the option, at step 1105, and then invokes the UNIX system CPIO command to form a CPIO format file 114 therefrom, at step 1106. Process 113 then exits, at step 1107.

Analogously to CPIO format file 108, CPIO format file 114 is transported by the user from target processor 11 to host processor 10 either electronically via a communication path or manually. Of course, if host processor 10 is the target processor, no such transport is necessary. When CPIO format file 114 is on host processor 10, the user invokes the CPIO command on host processor 10 to recreate the component files of the CPIO format file 114. The user then invokes BSTORE process 115 on host processor 10.

Figure 12:
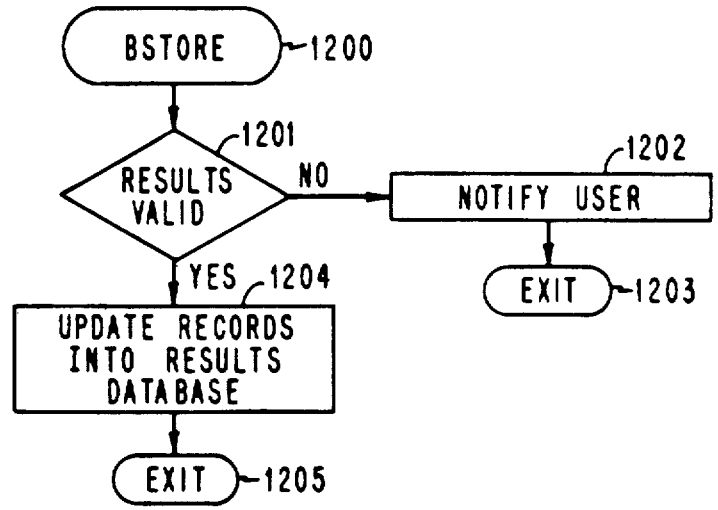
FIG. 12 is a flow diagram of BSTORE process of FIG. 1.

BSTORE process 115 is the results database administration tool. Its function is to update the test session results into results database 116. Process 115 is flowcharted in FIG. 12.

Upon being called, at step 1200, process 115 examines the contents of RESULTS file 110 to determine if the results are valid, at step 1201. Illustratively, it simply checks the format of the file records to make sure that they are in RUNINFO record 500 form. If the results are determined to be invalid, process 115 so notifies the user, at step 1202, and then exits, at step 1203. If no errors are found, process 115 calls upon the database management system to update new records 500 into results database 116, at step 1204. Process 115 then exits, at step 1205.

BBC process 118 and BBCMON process 120 together form a communication interface to test automation systems of other projects. While BBC process 118 is responsible for communicating messages across network 12, illustratively via UNIX MAIL, BBCMON process 120 is responsible for performing—generally through invocation of other processes—the functions required by the received messages.

A message 1900 received by BBC process 118 from another process of the test automation system has the form shown in FIG. 13. Message 1900 comprises fields 1901-1904, defined as follows.

TARGET field 1901: Identifies the one or more incarnations of the test automation system that are to receive the message by listing the network 12 addresses of the destination projects. These addresses are obtained by the process that created the message from the PROJINFO database referred to earlier.

TYPE field 1902: Indicates the type of message—a query, a query response, a download request, a download response, or a test update notice.

USERID field 1903: Identifies the user on whose behalf the message was originated. This field is filled in for query and download request type messages only; it is blank otherwise.

BODY field 1904: Contains the data being conveyed.

RESFILE field 1905: Identifies the file in which returned results are to be stored. This field exists only for query and query response type messages, and is formed by BBC process 118 itself.

Figure 14:
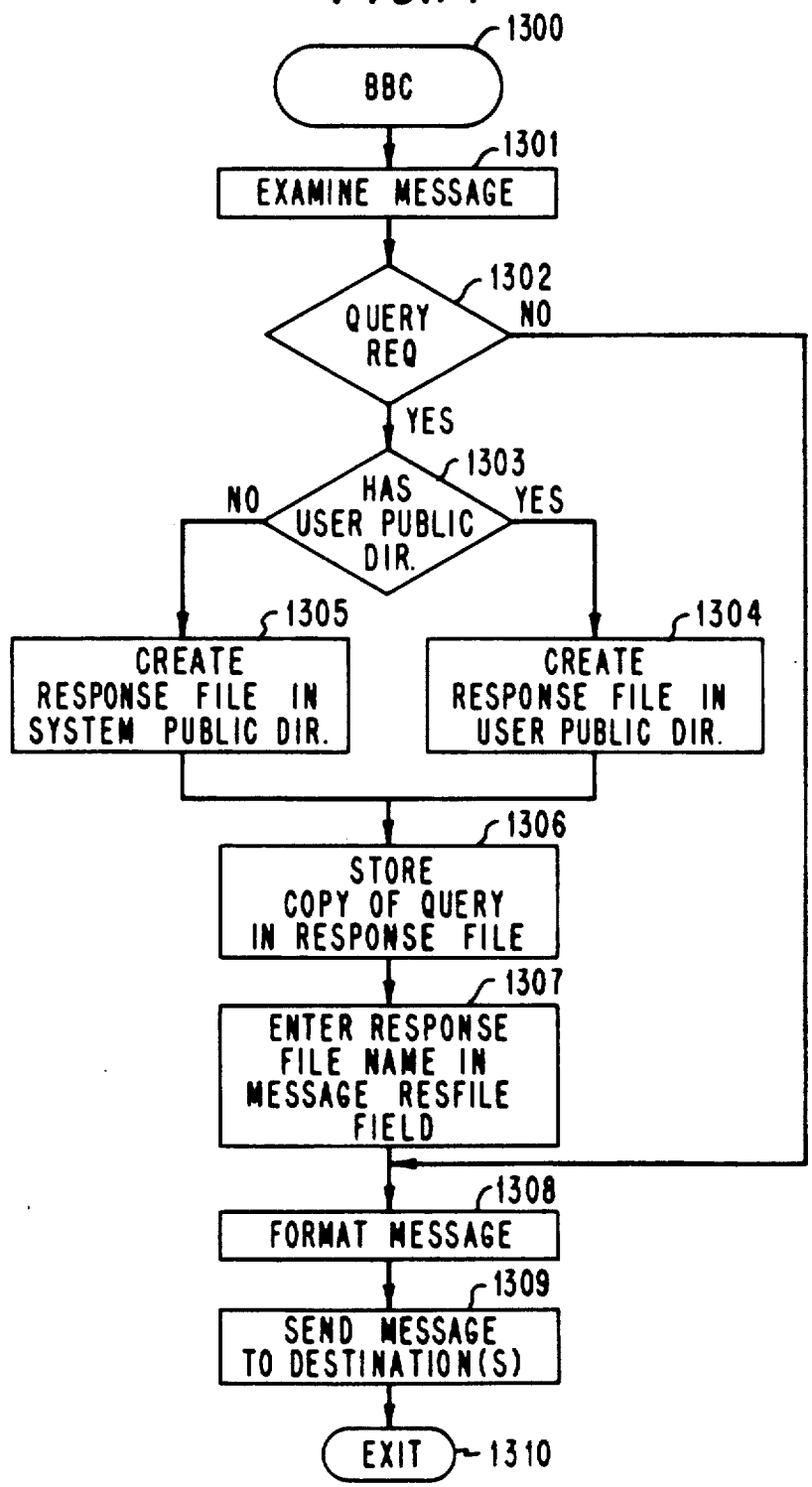
FIG. 14 is a flow diagram of BBC process of FIG. 1.

BBC process 118 is flowcharted in FIG. 14. In response to being called, at step 1300, process 118 examines TYPE field 1902 of message 1900 that it receives as part of the call, at step 1301, to determine whether it is a QUERY request message, at step 1302. A QUERY request message is a request from BQUERY process 105 for remote TESTINFO records 500. If message 1900 is a QUERY request, process 118 checks whether the user, identified by USERID field 1903, has a public directory 122 (see FIG. 1), at step 1303. A public directory is an open directory under the user's ID in which all users have permission to read, write, and execute. It is generally used for transferring files among users. If the user has a public directory 122, process 118 creates therein a response file, at step 1304, in which it stores a copy of message 1900, at step 1306. If the user does not have a public directory 122, process 118 accesses a public directory 123 (see FIG. 1) that exists for use by the test automation system as a whole, and creates therein the response file, at step 1305. Process 118 then stores a copy of the query contained by message 1900 in the response file, at step 1306. Following step 1306, process 118 appends a RESFILE field 1905 to message 1900 and stores therein the pathname of the response file, at step 1307.

Following step 1307, or if message 1900 was determined not to be a QUERY request at step 1302, process 118 formats message 1900 for transmission on network 12, at step 1308. The formatting activities include adding to message 1900 additional fields such as a message ID field, an origin field identifying the project that is the source of the message, and other fields as required. Process 118 then sends the formatted message 1900 across network 12 to its intended destination, or destinations, at step 1309, and exits, at step 1310.

At host processor 10 of a project, illustratively only messages destined for that project are collected from network 12 and saved in a buffer file 121 (see FIG. 1), in a conventional manner.

BBCMON process 120 is periodically invoked automatically, illustratively by the CRON utility of the UNIX operating system of host processor 10. Process 120 is flowcharted in FIGS. 15-20.

Figure 15:
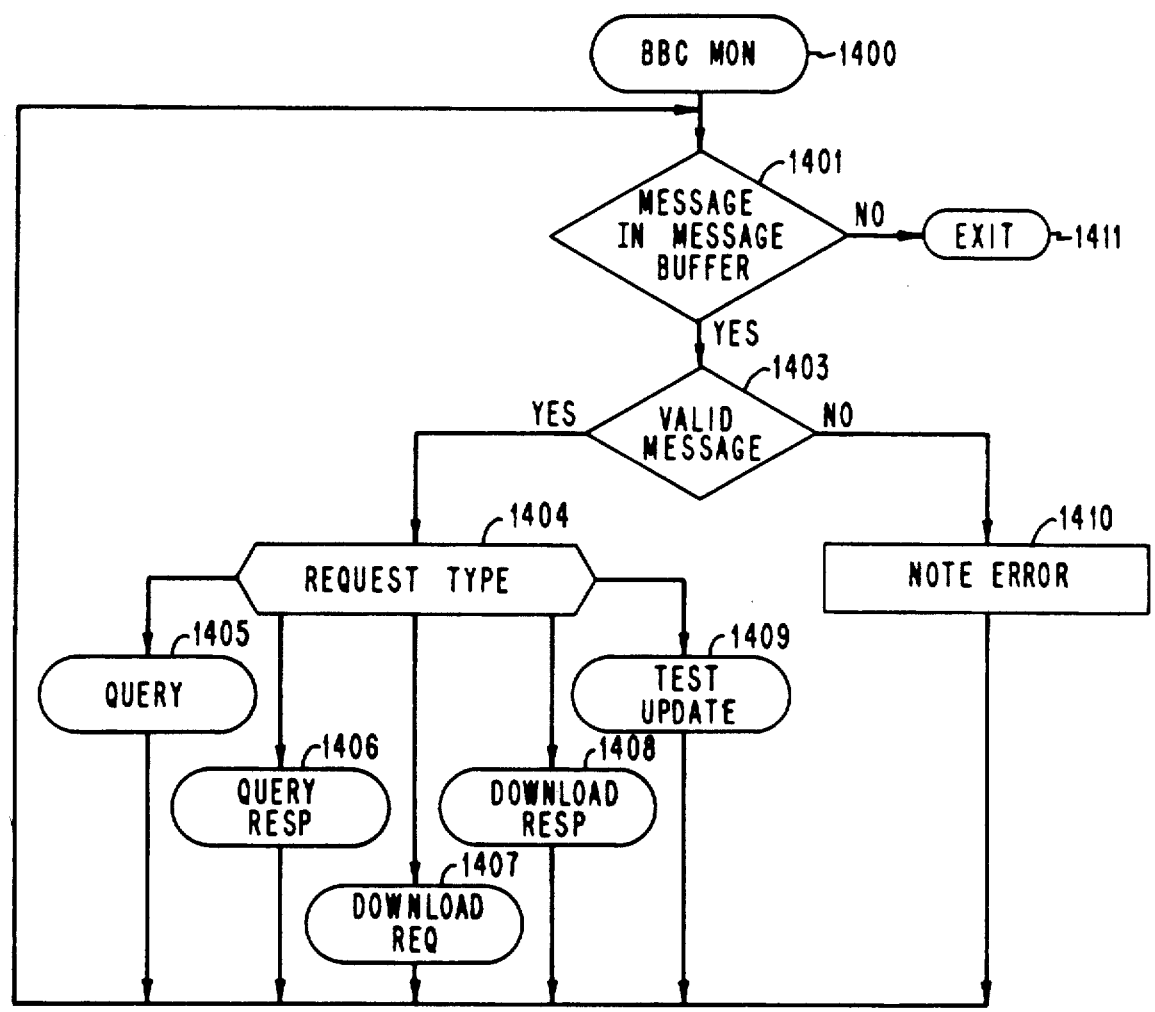
FIG. 15 is a flow diagram of BBCMON process of FIG. 1.

Referring to FIG. 15, upon being called, at step 1400, process 120 accesses buffer file 121 and, at step 1401, examines messages contained thereby to determine whether any of them are test messages 1900—ones destined for the test automation system. If not, process 120 exits, at step 1411.

If process 120 does encounter a test message 1900 in buffer file 121, it examines the format of the message to determine if it is valid, at step 1403. For example, process 120 checks whether message 1900 is properly formatted.

If message 1900 is invalid, process 120 makes a record thereof in an error file that it maintains for this purpose, at step 1410. Process 120 then returns to step 1401 to check buffer 121 for other test messages.

If message 1900 is found to be valid at step 1403, process 120 examines TYPE field 1902 thereof to determine the type of remote access that is being made, at step 1404, and on the basis of that determination executes an appropriate one of a number of routines, at steps 1405-1409.

If the access is a query request originated by a remote project's BQUERY process 105, process 120 executes QUERY routine of FIG. 16. At step 1501, process 120 extracts from BODY field 1904 of message 1900 the "keep" file that originating BQUERY process 105 provided to originating BBC process 118, which file holds responses given by a user to the prompts made by originating BQUERY process 115. Process 120 then calls the local project's BQUERY process 105, at step 1502, and passes to process 105 the extracted "keep" file.

In response to the call, BQUERY process 105 operates in "batch" mode and obtains from the "keep" file the responses to its prompts. When BQUERY process 105 performs the local access and moves its results to the specified destination, process 120 intercepts and captures the results in a file, at step 1503, in a conventional manner. Process 120 then constructs a message 1900 that includes this file in BODY portion 1904, at step 1504. Process 120 identifies the project that was the source of the QUERY request in TARGET field 1901, identifies message 1900 as a QUERY RESPonse in TYPE field 1902, returns the received user ID in USERID field 1903, and returns the received response file pathname in RESFILE field 1905 that it appends to message 1900. Process 120 then calls on BBC process 118 to send message 1900 to its destination, at step 1505, and returns to the flow of FIG. 15, at step 1506.

Returning to FIG. 15, if the access is determined at step 1404 to be a response by a remote project's BBCMON process 120 to a QUERY request message, the local process 120 executes QUERY RESPonse routine of FIG. 17. At step 1601, process 120 extracts from BODY field 1904 of message 1900 the file that remote BBCMON process 120 provided to remote BBC process 118, which file holds remote TESTINFO records 400. Process 120 then checks whether the user identified in USERID field 1903 who originated the query has a public directory 122, at step 1602. If the user has a public directory 122, process 120 checks, at step 1603, whether the user has in that directory the response file identified by RESFILE field 1905 of received message 1900. If so, process 120 stores the file extracted from BODY field 1904 of message 1900 in the response file, appending the extracted file to existing contents of the response file, at step 1607.

If the user does not have the response file in public directory 122, process 120 creates the response file therein, at step 1606, and then stores the file extracted from message 1900 in the response file, at step 1607.

If the user has no public directory 122, process 120 accesses public directory 123 of the test automation system and checks whether that directory contains the response file identified by RESFILE field 1905 of received message 1900, at step 1604. If not, process 120 creates the response file therein, at step 1605.

If public directory 123 does include the response file, or following creation thereof at step 1605, process 120 stores the file extracted from message 1900 in the response file, at step 1607.

Having stored the file received via message 1900, process 120 sends a notice—illustratively a UNIX mail message—to the user identified in USERID field 1903 to inform him or her of receipt of message 1900 and of the location of the response file, at step 1608. Process 120 then returns to the flow of FIG. 15, at step 1609.

Figure 18:
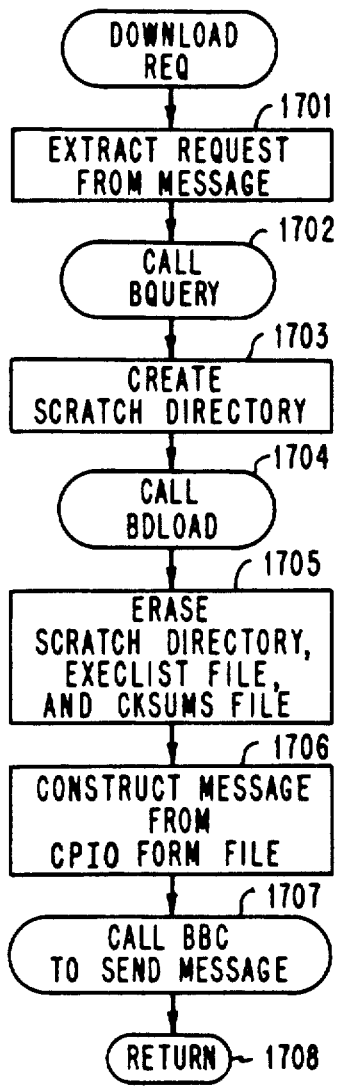
FIG. 18 is a flow diagram of DOWNLOAD REQ routine of FIG. 15.

Returning to FIG. 15, if the access is determined at step 1404 to be a download request by an originating project's BDLOAD process 107, process 120 executes DOWNLOAD REQ routine of FIG. 18. At step 1701, process 120 extracts from BODY field 1904 of received message 1900 the file that originating BDLOAD process 107 provided to originating BBC process 118, which file holds responses given by a user to the prompts made by originating BQUERY process 115. Process 120 then calls the local project's BQUERY process 105, at step 1702, and passes to process 105 the extracted file.

In response to the call, BQUERY process 105 treats the extracted file as the user and obtains from it the responses to its queries. BQUERY process 105 then performs the local access and creates a TESTLOCS file 106. When BQUERY process 105 finishes, process 102 creates a scratch directory 108, at step 1703, and then calls the local project's BDLOAD process 107, at step 1704, passing to process 107 TESTLOCS file 106 and scratch directory 108.

Figure 9:
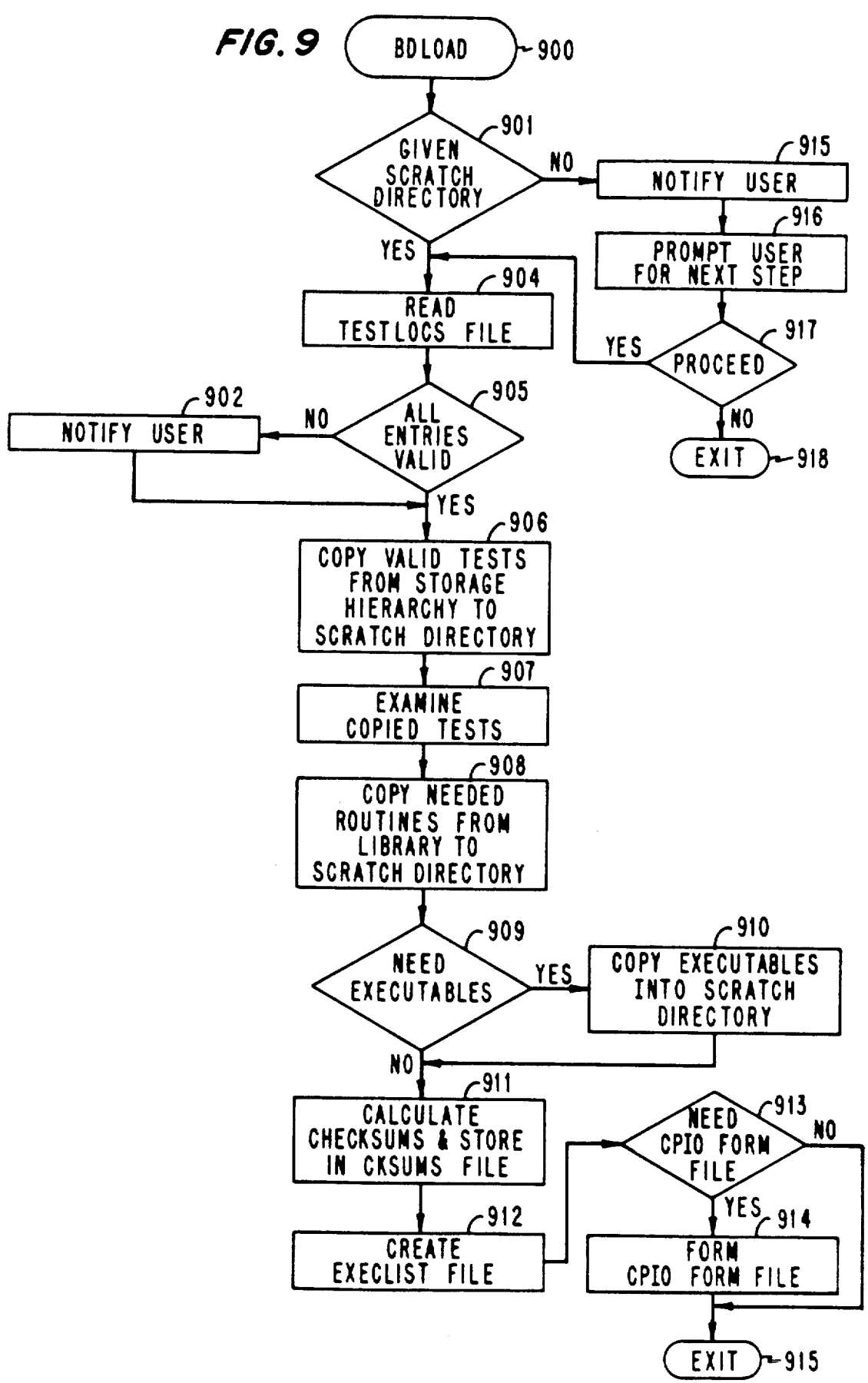
FIG. 9 is a flow diagram of BDLOAD process of FIG. 1.

In response, BDLOAD process 107 creates a CPIO format file 117 containing the tests identified by TESTLOCS file 106, an EXECLIST file 119, and a CKSUMS file 125, in the manner described for FIG. 9.

When BDLOAD process 107 has created CPIO format file 117, process 120 erases the scratch directory, EXECLIST file, and CKSUMS file from which CPIO format file 117 was created, at step 1705. Process 120 then constructs a message 1900 containing in BODY field 1904 that CPIO format file 117, at step 1706. Process 120 identifies the project that was the source of the DOWNLOAD REQuest in TARGET field 1901, identifies message 1900 as a DOWNLOAD RESPonse in TYPE field 1902, and returns the received user ID in USERID field 1903. Process 120 then calls on BBC process 118 to send message 1900 to the originator of the download request, at step 1707. Process 120 then returns to the flow of FIG. 15, at step 1708.

Figure 19:
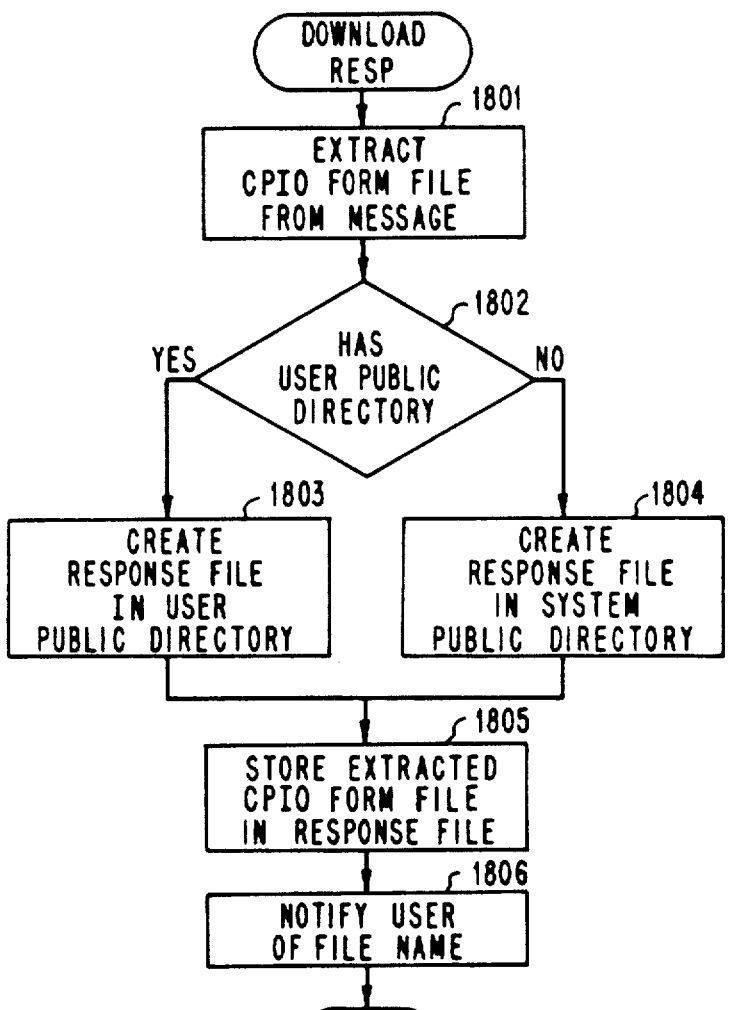
FIG. 19 is a flow diagram of DOWNLOAD RESP routine of FIG. 15.

Returning to FIG. 15, if the access is determined at step 1404 to be a response by a remote project's BBCMON process 120 to a DOWNLOAD REQuest message, the local process 120 executes DOWNLOAD RESPonse routine of FIG. 19. At step 1801, process 120 extracts from BODY field 1904 of message 1900 CPIO format file 117 formed by the remote BDLOAD process 107. Process 120 then checks whether the user identified in USERID field 1903 who originated the download request has a public directory 122, at step 1802. If so, process 120 creates a response file in the user's public directory 122, at step 1803, and stores therein CPIO format file 117 received from the remote project, at step 1805. Process 120 assigns to the response file a file name comprising message 1900 ID and a unique number.

If the user has no public directory 122, process 120 accesses public directory 123 of the system and creates therein a response file, at step 1804. Process 120 then stores the received CPIO format file 117 in this response file, at step 1805. Process 120 assigns to the response file a file name comprising message 1900 ID and a unique number.

Having stored the received CPIO format file 117, process 120 sends a notice to the user identified in USERID field 1903 to inform him or her of the location of the response file, at step 1806. Process 120 then returns t the flow of FIG. 15, at step 1807.

Figure 20:
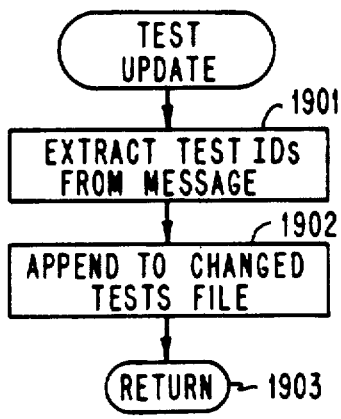
FIG. 20 is a flow diagram of TEST UPDATE routine of FIG. 15.

Returning to FIG. 15, if the access is determined at step 1404 to be a notice from another project identifying tests of that project that have been modified, process 120 executes TEST UPDATE routine of FIG. 20. At step 1901, process 120 extracts from received message 1900 the file containing the list of IDs of changed tests, and at step 1902 stores the list in a file 124 (see FIG. 1) identifying all changed tests of all remote projects, which file is maintained for this purpose by the project. Process 120 then returns to the flow of FIG. 15, at step 1903.

Returning to FIG. 15, following execution of a routine at steps 1405-1409, process 120 returns to step 1401 to check buffer file 121 for other test messages 1900.

Of course, it should be understood that various changes and modifications to the illustrative embodiment described above will be apparent to those skilled in the art. Such changes and modifications can be made without departing from the spirit and the scope of the invention and without diminishing its attendant advantages. It is therefore intended that all such changes and modifications be covered by the following claims.

What is claimed is:

1. A test automation system comprising:
   first means for storing test programs that selectively include information descriptive of the stored test programs;
   second means connected tot eh first means, responsive to being given descriptions of the stored test programs for storing the descriptions of the stored test programs separate from the test programs;
   third means, cooperative with the second means, when activated for determining, from test program descriptions which are stored in the second means, which ones of the stored test programs have predetermined characteristics;
   fourth means, connected to the first and the third means, for extracting from the first means those stored test programs which are identified by the third means; and
   fifth means when activated for extracting from the test programs stored in the first means any included information that describes the stored test programs for storage of the extracted information as part of the program descriptions in the second means.

2. The test automation system of claim 1 further comprising:
   a target processor serving as an object of testing and a host processor for facilitating the test, the host processor including
   the first means,
   the second means,
   the third means,
   the fourth means,
   the fifth means, and
   sixth means, connected to the fourth means, for downloading the extracted test programs from the host processor to the target processor; and the target processor including
   seventh means communicatively connected to the sixth means, for executing test programs downloaded to the target processor from the host processor by the sixth means and collecting results of the executed test programs.

3. The system of claim 1 further comprising
   a database in the host processor for storing test program results separate from the first and the second means, and
   eighth means in the host processor for storing in the database test program results collected by the seventh means.

4. The system of claim 1 further comprising
   sixth means for prompting a user for test program description information and for storing information received in response to the prompts in the second means; and wherein
   the fifth means are for adding information extracted from the test programs stored in the first means to information stored by the sixth means in the second means.

5. The system of claim 1 further comprising:
   sixth means for communicating with another test automation system; and
   seventh means, responsive to receipt from the other test automation system of a communicated request for test programs having selected characteristics, for causing the third means to identify test programs having the selected characteristics, causing the fourth means to extract the identified test programs, and causing the sixth means to communicate the extracted test programs to the other test automation system.

6. The system of claim 1 wherein
   the third means are responsive to receipt of a request from another test automation system, for searching through stored test program descriptions to identify test programs having characteristics specified by the request; the system further comprising:
   sixth means, responsive to receipt of the request, for transferring to the other test automation system test programs extracted by the fourth means.

7. The system of claim 1 wherein
   the third means are responsive to receipt of a request from another test automation system, for extracting from the second means descriptions of test programs having characteristics specified by the request; the system further comprising
   sixth means, responsive to receipt of the request, for transferring to the other test automation system test program descriptions extracted by the third means.

8. The system of claim 2 wherein
   the target processor further includes
   eighth means connected to the seventh means for uploading the results collected by the seventh means from the target processor to the host processor; and wherein
   the host processor further includes ninth means communicatively connected to the eighth means for reporting to a user results of executed test programs.

9. A test automation system comprising:
   a storage arrangement for storing test programs;
   a first database connected to the storage arrangement for storing descriptions of the stored test programs;
   first means connected to the first database, for searching the first database to identify stored test programs having characteristics requested by a user;
   second means connected to the storage arrangement and to the first means, for extracting from the storage arrangement the stored test programs identified by the first means;
   third means connected to the second means, for executing the test programs extracted by the second means and for collecting results of the executed test programs;
   fourth means for prompting a user for test program description information and storing information received in response to the prompts in the first database; and
   fifth means for extracting test program description information from test programs stored in the storage arrangement and for adding the extracted information to test program description information stored in the first database.

10. The test automation system of claim 9 further comprising:
    a second database for storing results of executed test programs; and
    sixth means, for storing the results collected by the third means in the second database.

11. The system of claim 10 wherein
    the second means comprise
    means for storing the extracted test programs in an output file for transfer from a first processor that includes the storage arrangement to a second processor for having the test programs executed on the second processor; the system further comprising
    means for storing test program results collected by the third means on the second processor in an output file for transfer to the first processor.

12. The system of claim 10 further comprising:
    means for extracting from the second database test program results having characteristics requested by a user.

13. The system of claim 9 wherein
    the third means are further for reporting to a user results of executed test programs.

14. The system of claim 9 further comprising
    sixth means for communicating with another test automation system;
    seventh means for causing the sixth means to communicate to the other system a request for test programs having characteristics specified by a user; and
    eighth means, responsive to receipt from the other test automation system of a request for test programs, for causing the first means to search the first database to identify test programs having characteristics specified by the received request, for causing the second means to extract from the storage arrangement the test programs identified by the first means, and for causing the sixth means to communicate the extracted test programs to the other test automation system: so that
    test programs may be shared by a plurality of test automation system.

15. The system of claim 9 wherein
    the first means comprise means for searching the first database to identify and extract descriptions of stored test programs having characteristics requested by a user.

16. The system of claim 15 further comprising:
    sixth means for communicating with another test automation system;
    seventh means for causing the sixth means to communicate to the other system a request for descriptions of test programs having characteristics specified by a user; and
    eighth means, responsive to receipt from the other test automation system of a request for test program descriptions, for causing the first means to search the first database to identify and extract descriptions of test programs having characteristics specified by the received request, and for causing the sixth means to communicate the extracted test program descriptions to the other test automation system; wherein
    test program descriptions may be shared by a plurality of test automation systems.

17. A test automation system comprising:
    a storage arrangement comprising a hierarchical file structure for storing files of tests, each test comprising at least one file including at least one executable file;
    a first database comprising records each record for storing information describing a test;
    a second database comprising records each record for storing information describing results of execution of a test;
    first means for creating first database records by prompting users for information describing tests and for storing received information in the first database;
    second means for updating first database records by extracting information describing test from files of tests stored in the storage arrangement and storing extracted information in the records of the first database;
    third means, responsive to a user request for first database records of descriptions of tests having certain characteristics, for searching the records in the first database for the requested records and providing the requested records to the user, and further responsive to a user request for tests having certain characteristics, for searching the records in the first database to identify therefrom the requested tests and listing the requested tests in a first file means;
    fourth means, responsive to a request, for extracting from the storage arrangement the files of tests listed in the first file means and storing extracted files of tests in a second file means;
    fifth means for executing executable files of the tests stored in the second file means and storing results of execution of the tests' files in a third file means; and
    sixth means for creating second database records by storing in the second database test execution results stored in the third file means.

18. The system of claim 17 wherein
    the third means are further responsive to a user request for second database records containing information having certain characteristics, for searching the records in the second database for the requested records and providing the requested records to the user.

19. The system of claim 17 wherein
    the fourth means include
    means for creating a first output file means comprising contents of the second file means for transfer from a first processor that includes the first and the second database and the storage arrangement to a second processor for having executable files of tests executed on the second processor; the system further comprising
    seventh means for creating a second output file means comprising contents of the third file means for transfer from the second processor to the first processor.

20. The system of claim 17 for us in an arrangement comprising a plurality of test automation systems interconnected by a communication network, further comprising:
    seventh means for transferring files between systems connected to the network; wherein
    the third means comprise
    means, responsive to a user request for one of: (a) first database records of descriptions of tests having certain characteristics and (b) tests having certain characteristics, for storing the request in a fourth file means and causing the seventh means to transfer the fourth file means to another system; and the system further comprising eighth means, responsive to receipt from a system connected to the network of a fourth file means containing a request for (a) first database records of descriptions of tests having certain characteristics, for (a.1) causing the third means to respond to the request, for (a.2) storing requested records provided by the third means in a fifth file means, and for (a.3) causing the seventh means to transfer the fifth file means to the system from which the request to which the eighth means is responding was received, and the eighth means further responsive to receipt from a system connected to the network of a fourth file means containing a request for (b) tests having certain characteristics, for (b.1) causing the third means to respond to the request, thereafter for (b.2) causing the fourth means to respond to the request, for (b.3) storing files of tests that were stored by the fourth means in the second file means in a fifth file means, and for (b.4) causing the seventh means to transfer the fifth file means to the system from which the request to which the eighth means is responding was received; so that files of tests may be shared among a plurality of test automation systems.

21. The system of claim 10 wherein the second means comprise means for storing in a third file means a list of tests whose first database records of descriptive information have been updated and causing the seventh means to transfer the third file means to other systems.

* * * * *